US008601742B2

(12) United States Patent
Domholt et al.

(10) Patent No.: US 8,601,742 B2
(45) Date of Patent: Dec. 10, 2013

(54) HYDRAULIC SYSTEMS AND METHODS THEREOF

(75) Inventors: Norman L. Domholt, Minnetrista, MN (US); John David, Mound, MN (US); Richard Reid, Minnetonka, MN (US)

(73) Assignee: NPC Robotics, Inc., Mound, MN (US)

( * ) Notice: Subject to any disclaimer, the term of this patent is extended or adjusted under 35 U.S.C. 154(b) by 839 days.

(21) Appl. No.: 12/701,180

(22) Filed: Feb. 5, 2010

(65) Prior Publication Data

US 2010/0199565 A1 Aug. 12, 2010

Related U.S. Application Data

(60) Provisional application No. 61/150,540, filed on Feb. 6, 2009.

(51) Int. Cl.
*B60J 5/00* (2006.01)

(52) U.S. Cl.
USPC .................... 49/140; 49/324; 60/415; 60/468

(58) Field of Classification Search
USPC ............................... 49/140, 324; 60/415, 468
See application file for complete search history.

(56) References Cited

U.S. PATENT DOCUMENTS 1,341,775 A 6/1920 Bowers
3,136,537 A 6/1964 Whitfield
3,672,402 A * 6/1972 Bloemer ......................... 138/31
3,948,000 A 4/1976 Pedersen
4,094,158 A 6/1978 LeVere et al.
4,113,063 A 9/1978 Troy
4,149,644 A 4/1979 Fuller
4,235,047 A 11/1980 Turner
4,296,570 A 10/1981 Balbach et al.
4,518,095 A * 5/1985 Engwert ....................... 220/260
4,644,693 A 2/1987 Wang
4,679,764 A * 7/1987 Smith et al. ..................... 251/14
4,941,320 A 7/1990 Kersten et al.
5,396,692 A 3/1995 Floyd et al.
5,851,049 A * 12/1998 Squire et al. ............... 296/146.4
5,916,139 A * 6/1999 Tieben ............................ 60/413
6,314,728 B1 * 11/2001 Schilling et al. ................ 60/436
6,962,023 B2 11/2005 Daniels et al.
7,243,976 B2 7/2007 Okada et al.
8,033,107 B2 * 10/2011 Tikkanen ........................ 60/464
2008/0026095 A1 * 1/2008 Wessely et al. ............... 425/556
2009/0120002 A1 5/2009 Domholt

OTHER PUBLICATIONS

"Making the Choice: Selecting and Applying Piston, Bladder, and Diaphragm Accumulators", Parker Hydraulics Brochure 1660-USA, http://www.parkercom/literature/Hydraulic%20Accumulator/pdf%20files/MakingChoices.pdf (16 pgs.) (at least as early as Oct. 21, 2008).

* cited by examiner

*Primary Examiner* — Dennis Pedder
(74) *Attorney, Agent, or Firm* — Pauly, DeVries Smith & Deffner, LLC

(57) ABSTRACT

An orientation-independent hydraulic system comprises a dynamic fluid reservoir defining a first volume substantially equal to the volume of the fluid therein, and a hydraulic cylinder in fluid communication with the dynamic fluid reservoir. The hydraulic cylinder has a second volume of hydraulic fluid and a piston rod configured to extend and retract in response to changes in the second volume. A first hydraulic pump is configured to pump hydraulic fluid between the hydraulic cylinder and the dynamic fluid reservoir, thereby moving the piston rod between the extended and retracted positions.

27 Claims, 19 Drawing Sheets

HYDRAULIC SYSTEMS AND METHODS THEREOF

CROSS REFERENCE TO RELATED APPLICATION

This application claims the benefit of U.S. Provisional Patent Application Ser. No. 61/150,540, filed Feb. 6, 2009, which application is hereby incorporated by reference in its entirety.

BACKGROUND

Hydraulic systems are implemented in a variety of situations to operate machinery and move mechanical components, where manually moving such components would prove cumbersome, heavy, or otherwise inappropriate for one or more individuals. For example, lifting heavy equipment, opening heavy doors, and accelerating/otherwise moving heavy items including vehicles can all be done by hydraulic systems. Such systems are, in many scenarios, orientation-dependent, which reduces applicability of those systems. In addition, the size of the hydraulic systems can prevent applicability of the systems to some scenarios.

SUMMARY OF THE INVENTION

The technology disclosed herein includes an orientation-independent hydraulic system having a dynamic fluid reservoir defining a first volume substantially equal to the volume of the fluid therein, and a hydraulic cylinder in fluid communication with the dynamic fluid reservoir. The hydraulic cylinder has a second volume of hydraulic fluid and a piston rod configured to extend and retract in response to changes in the second volume. A first hydraulic pump is configured to pump hydraulic fluid between the hydraulic cylinder and the dynamic fluid reservoir, thereby moving the piston rod between the extended and retracted positions.

In a particular embodiment the technology disclosed herein is a door opener system for opening and closing a door relative to a structure having a hydraulic cylinder. The hydraulic cylinder has a cylinder barrel attached to a door on a structure and a piston rod that has a distal end, which is moveable between an extended position and a retracted position. The distal end is configured to attach to the structure. A first hydraulic pump is configured to pump hydraulic fluid to and from the hydraulic cylinder, thereby moving the piston rod between the extended and retracted positions. A power source is operatively connected to a motor attached to the first hydraulic pump

BRIEF DESCRIPTION OF THE DRAWINGS

The invention may be more completely understood and appreciated in consideration of the following detailed description of various embodiments of the invention in connection with the accompanying drawings.

DETAILED DESCRIPTION

The system disclosed herein generally pertains to a device for the displacing one structure relative to another structure wherein the system incorporates the use of hydraulics. In one embodiment the system includes a hydraulic cylinder with a cylinder barrel attached to a first structure and a piston rod with a distal end attached to a second structure. The distal end of the cylinder is moveable between an extended position and a retracted position. A first hydraulic pump (and possibly a second hydraulic pump, or more) is configured to pump hydraulic fluid to and from the hydraulic cylinder to move the piston rod between the extended and retracted positions. A power source is operatively connected to motor(s) in communication with the first (and second) hydraulic pump. The pumps displace hydraulic fluid from a fluid reservoir.

The fluid reservoir can have a variety of configurations, but in one embodiment is a dynamic fluid reservoir that has a volume substantially equal to the volume of the fluid therein. The fluid reservoir is in fluid communication with the hydraulic cylinder. The hydraulic cylinder has a second volume of hydraulic fluid and the piston rod configured to extend and retract in response to changes in the second volume.

First Embodiment

Figure 1:
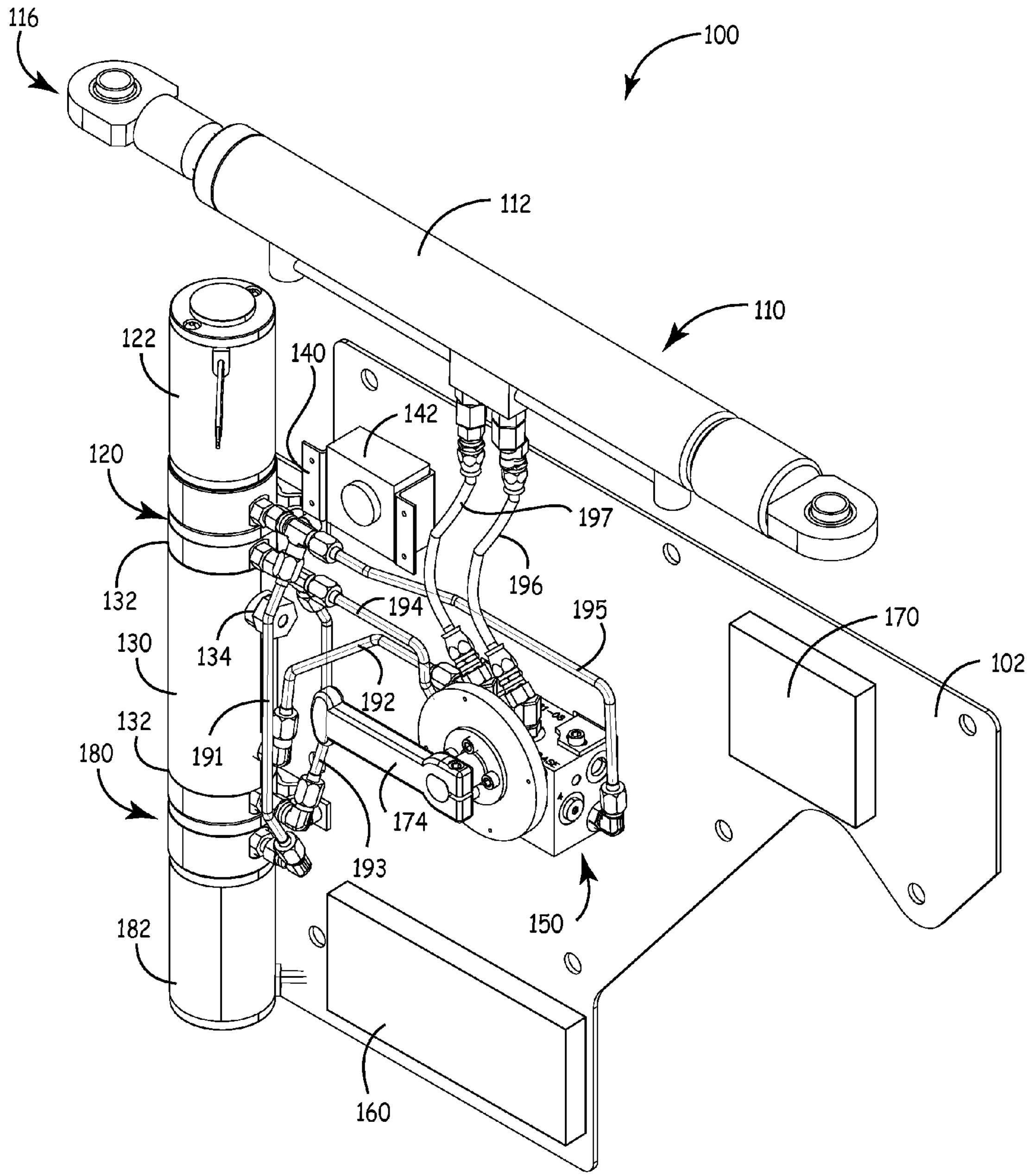
FIG. 1 is a perspective view of one embodiment of the technology disclosed herein.
Figure 2:
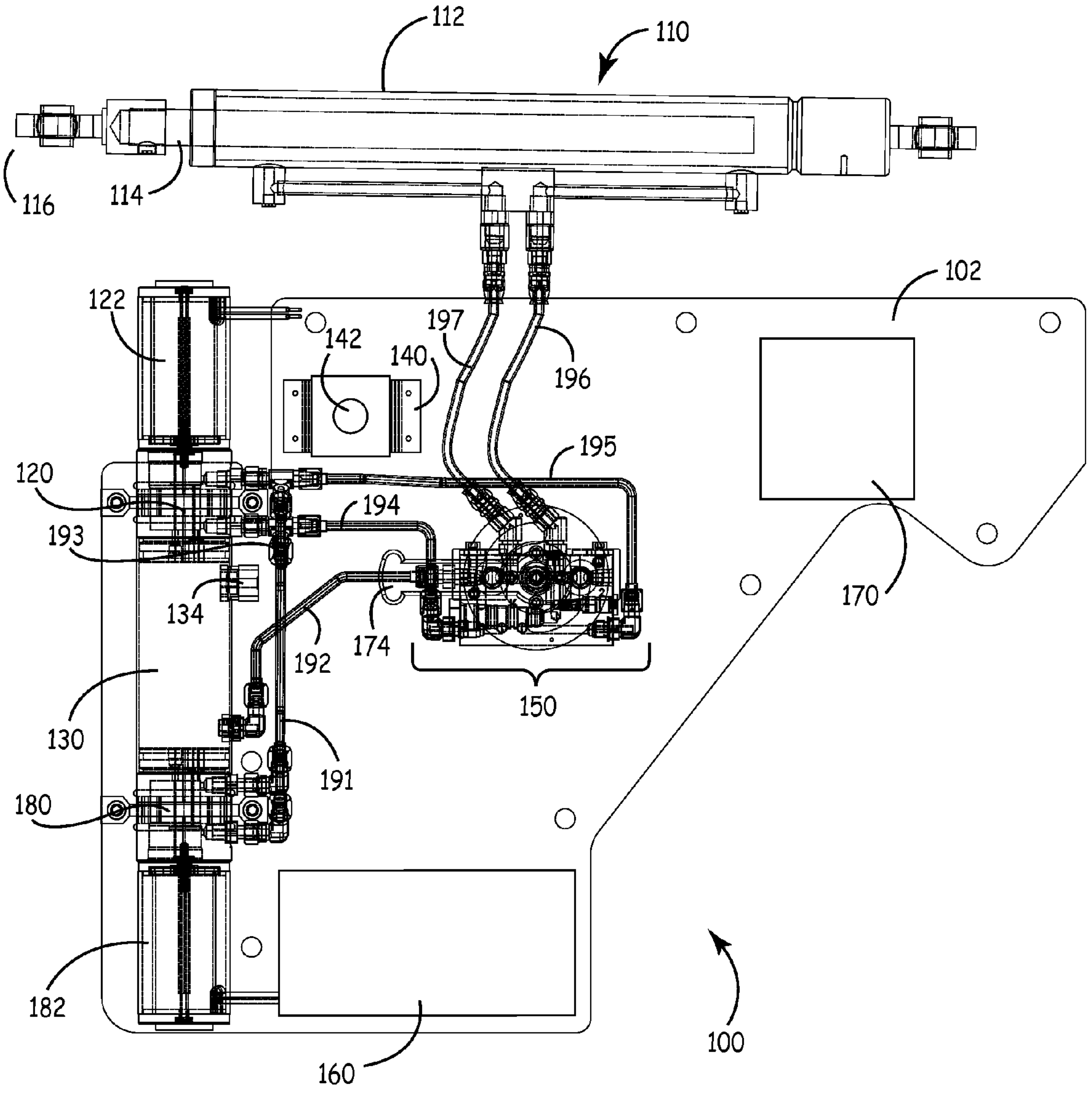
FIG. 2 is a front view of the embodiment depicted in FIG. 1.

FIG. 1 is a perspective view of one embodiment of the technology disclosed herein. FIG. 2 is a front view of the embodiment depicted in FIG. 1. Generally FIGS. 1 and 2 depict a hydraulic system 100 that can be used for opening and closing a first structure, such as a door, relative to a second structure. The system 100 broadly has a hydraulic cylinder 110, a first hydraulic pump 120, a second hydraulic pump 180, a first motor 122, a second motor 182, a hydraulic reservoir 130, and a hydraulic manifold 150 mounted on a panel 102. The system 100 also incorporates a power source 170 that is schematically depicted. Electrical connections are not shown in the figures provided herein for clarity of illustration.

The panel 102 is generally for mounting components of the hydraulic system 100 thereon. The panel 102 is generally rigid, is configured to be mounted on a first structure, and is mounted such that neither the panel 102, nor the components mounted thereon, translates relative to the first structure. The system 100 can be configured, however, such that components relative to the panel 102 can be repositioned based on convenience or necessity. The panel 102 can be constructed of a variety of materials that provide at least minimal rigidity and durability. In various embodiments the panel 102 is constructed of a metal such as an aluminum or steel alloy. It can be desirable to reduce the weight of the panel 102 by using lighter materials and/or removing material from the panel 102 with cut-outs and minimizing the size of the panel 102, as examples. As mentioned above, the panel 102 is generally mounted to a first structure. The first structure can be a vehicle door in multiple embodiments. In some of those embodiments, the panel is mounted on the interior side of a vehicle door.

The hydraulic cylinder 110 is a cylinder barrel 112 having a piston rod 114. The piston rod 114 has a distal end 116 that is configured to attach to a second structure. The cylinder barrel 112 receives hydraulic fluid on either side of a piston (not shown) attached to the piston rod 114, which moves the piston rod 114 between extended and retracted positions relative to the hydraulic cylinder 110 (and, therefore, the rest of the door opener system 100 including the panel). The second structure to which the distal end 116 of the piston rod 114 is configured to be attached is a vehicle body in multiple embodiments. The hydraulic cylinder 110 can include a transducer 118 that can indicate the position of the piston rod 114 relative to the cylinder barrel 112. The transducer is explained in more detail in the discussion of FIGS. 5 and 6, below. The hydraulic cylinder 110 can be constructed of a variety of materials known in the art. In instances where weight minimization is of interest, components of the hydraulic cylinder 110 can be constructed of a lighter material such as aluminum.

Hydraulic fluid is transmitted to the hydraulic cylinder 110 from the hydraulic reservoir 130 through a first hydraulic pump 120 and a second hydraulic pump 180 and the hydraulic fluid lines 191-197. The hydraulic reservoir 130 is configured to hold pressurized hydraulic fluid. An air valve 134 is defined by hydraulic reservoir 130 and can be configured to allow one-way airflow into the hydraulic reservoir 130.

The hydraulic reservoir 130 defines a compartment that is in fluid communication with the first hydraulic pump 120 and second hydraulic pump 180 through fluid lines 191-197. The first hydraulic pump 120 is positioned on a top surface of the reservoir 130 and is configured to pump hydraulic fluid to the hydraulic cylinder 110, thereby moving the piston rod 114 between the extended and retracted positions. The first hydraulic pump 120 includes an intake tube extending down into the hydraulic reservoir 130 below the level of the hydraulic fluid within the hydraulic reservoir 130. A crimp connection 132 couples the hydraulic reservoir 130 to the first hydraulic pump 120 and the second hydraulic pump 180, and can provide a hydraulic seal to prevent fluid leaks.

The second hydraulic pump 180 is positioned adjacent to a bottom surface of the reservoir 130 and configured to pump hydraulic fluid to the hydraulic cylinder 110, moving the piston rod 114 between the extended and retracted positions. In at least one embodiment, the first hydraulic pump 120 and second hydraulic pump 180 are bi-directional cartridge pumps that are 1.5 inches (34.85 millimeters) in diameter, 2.28 inches (58 millimeters) in length, and produce flow rates of 0-1.5 gallons per minute (6.82 liters per minute). It will be appreciated that a variety of types of pumps could be used depending on the particular needs of the system, without deviating from the scope of the technology disclosed herein. In some embodiments the pump can be external to the system described herein, or can have numerous and varying locations. In addition, differently sized pumps can be used, depending on the volume of fluid that needs to be pumped as determined by the size of the hydraulic cylinder. An opening in the bottom of the hydraulic reservoir 130 allows fluid to be drawn out by the second hydraulic pump 180.

The first motor 122 is in operative communication with the first hydraulic pump 120, and the second motor 182 is in operative communication with the second hydraulic pump 180. In various embodiments the motors are electric. In various embodiments the first motor 122 and the second motor 182 are in mechanical communication with the first hydraulic pump 120 and the second hydraulic pump 180, respectively. In such embodiments the first motor 122 and the second motor 182 can have a rotatable split flange (not shown) that are each configured to engage with a rotatable paddle of the first hydraulic pump 120 and the second hydraulic pump 180, respectively.

In at least one embodiment only one pump is incorporated into the system. In such an instance weight minimization of the system may be of interest. In such an embodiment (using a 1¾"bore by 12" stroke by 1" diameter rod cylinder) the piston rod 114 takes about 12 seconds to fully extend or retract. In another embodiment, two pumps are incorporated into the system. In such an embodiment (using a 1¾"bore by 12" stroke by 1" diameter rod cylinder) the piston rod 114 takes about 8 seconds to fully extend or retract, and the system can push up to 2 metric tons (4,400 lbs) of force. In any embodiment the amount of time required to fully extend (retract) a piston rod is substantially dependent upon the amount of fluid required as determined by the size of the cylinder barrel 112 bore (inside diameter) in relation to the diameter of the piston rod 114 and the length of the piston rod 114.

The power source 170 is operatively connected to the first hydraulic pump 120 through the first motor 122. The power source can also be operatively connected to a second hydraulic pump 180 through the second motor 182. The power source provides a DC voltage in various embodiments. In some embodiments the power source can provide AC voltage. In at least one embodiment multiple power sources can be incorporated into the system, providing either AC voltage or DC voltage. Suitable power sources can be batteries, solar panels, a vehicle alternator, vehicle batteries, or many other power sources.

A bracket 140 is included in the system for an emergency stop 142. The emergency stop 142 is in operable communication with the first motor 122 and the second motor 182 and has user-interface such as a button or lever that, when engaged, immediately stops operation of the motors 122, 182. The emergency stop 142 can be disposed within the electrical connection path between the power source and the first motor 122 and the power source and the second motor 182, and when engaged can stop electrical communication between the power source and the first motor 122 and the power source and the second motor 182.

The hydraulic manifold 150 directs fluid flowing from the fluid lines 191 between the hydraulic reservoir 130 and the hydraulic cylinder 110. Such fluid flow is described in more detail in the description of FIGS. 3 and 4, below. In various instances the hydraulic manifold 150 incorporates a bypass system that is configured to allow the free flow of hydraulic fluid between the hydraulic reservoir 130 and the hydraulic cylinder 110, when engaged. Such a configuration allows flow from both sides of the hydraulic cylinder 110 directly back to the hydraulic reservoir 130. Fluid stabilization between the hydraulic cylinder 110 and hydraulic reservoir 130 can be used to prevent a vacuum from being formed when the bypass system is engaged by eliminating the tortuous path between the hydraulic cylinder and hydraulic reservoir. In various embodiments the bypass system 150 can be engaged from multiple locations. In the embodiment depicted in FIG. 1 and FIG. 2, the bypass system is engaged inside a vehicle using a bypass handle 174. In other embodiments where the system 100 is used on a vehicle door, the bypass system can be engaged from inside the vehicle, outside the vehicle, or both.

As stated, the bypass system is engaged by virtue of a bypass handle 174 that is in operative communication with the bypass system. In the embodiment depicted, the bypass system is engaged by pivoting the bypass handle 174, although it will be appreciated that the bypass system could be engaged through a variety of means such as buttons, levers, and the like. In some embodiments there can be multiple bypass handles in communication with the bypass system. For example, in one embodiment the bypass handle 174 depicted extends through the panel 102 and the first structure to which the panel 102 is mounted, such that the bypass system can be engaged from either side of the first structure.

Other embodiments of the technology disclosed herein do not include a bypass system or bypass handle. In these embodiments, manual movement of the piston rod is not possible, therefore fluid will not flow between the reservoir and hydraulic cylinder.

A controller 160 interfaces various electrical components of the system, and can generally have a variety of configurations, known and unknown in the art, without deviating from the scope of the technology disclosed herein. The first motor 122, second motor 182, first pump 120, second pump 180, and transducer 118 can all connect to the controller for engagement and/or analysis by a user. Various electronic safety elements can also be incorporated with the controller 160. For example, the emergency stop 142 operated by a user could be connected to the controller 160 to shut down the system and/or to reverse the direction of movement of the system. In another example, an emergency controller shutdown can shut down the system 100 automatically if the system 100 meets particular conditions, such as shutting down the system 100 when the piston rod 114 fails to move for a certain period of time.

The controller 160 can provide a ramp-up and ramp-down to the speed of the extending and retracting process of the piston rod such that, for example, during the last inch of travel the piston rod and, therefore, the pump(s), operate more slowly. The controller can also interface a battery to the system. In some embodiments, the battery could be a vehicle battery. In some other embodiments, the battery could be a system-specific battery 170 with the vehicle battery used as a back-up. The controller 160 could also interface to a user interface, such as the dashboard of a vehicle in a variety of embodiments. In one embodiment the controller 160 could also monitor fluid pressure at various points in the system.

In various embodiments, the depth of the system 100 is five inches or less, where the depth is measured from the furthest point of the bypass system (FIG. 9, 274*b*, for example) on the back side of the panel to the furthest point on the front of the system, the bypass lever 174, for example. In at least one embodiment where there is not a bypass system extending through the panel, the depth of the system 100 is four inches or less. In at least one embodiment, where there is not a bypass system the depth of the system 100 is three inches or less. In one embodiment the depth of the system 100 is 2.75 inches.

Figure 3:
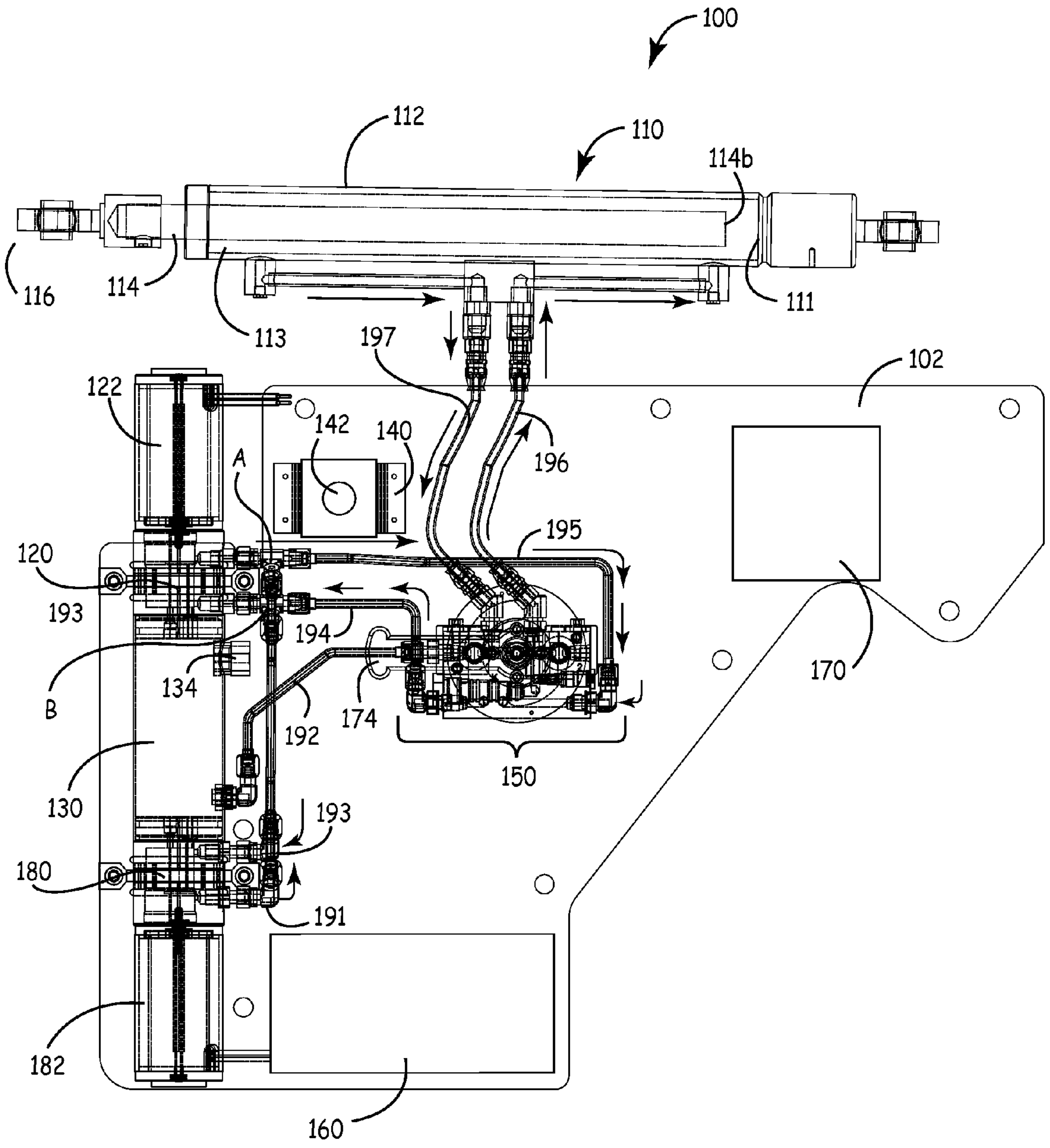
FIG. 3 is a schematic of fluid flow during a first operation according to one embodiment of the technology disclosed herein

FIG. 3 is a schematic of fluid flow during a first operation consistent with the embodiment depicted in FIG. 1 and FIG. 2. Fluid pressure on a first side 111 of the piston 114*b* extends the piston rod 114 such that the structure attached to the distal end 116 of the piston rod 114 is moved relative to the cylinder barrel 112. Such operation of the system can be consistent with moving a first structure away from a second structure. In one embodiment it is consistent with opening a vehicle door relative to a vehicle.

A user provides input to the user interface such as a button, lever, dial, or the like, which determines the direction of operation of the first pump 120 and second pump 180. Such user interface can be located on the controller in 160, in one embodiment, on a vehicle dashboard, in another embodiment, or a variety of other locations without deviating from the scope of the technology disclosed herein. To extend the piston rod, the first motor 122 operates the first pump 120, which pumps fluid from the fluid reservoir 130 through a first fluid line 195 in the direction of the arrow depicted. The fluid then flows through a hydraulic manifold 150 and is routed to a second fluid line 196 leading to the first side 111 of the cylinder barrel, in the direction of the arrows indicated therein.

The second motor 182 operates the second pump 180, which pumps fluid from the fluid reservoir 130 through a third fluid line 191 that merges with the first fluid line 195 at intersection A. The fluid then is routed to the second fluid line 196 through the hydraulic manifold 150, leading to the first side 111 in the cylinder barrel. Fluid flow into the first side 111 of the cylinder barrel causes extension of the piston rod 114 and results in expulsion of hydraulic fluid from the second side 113, through a fourth fluid line 197 in the direction of the arrow depicted. From the fourth fluid line 197 the fluid passes through the hydraulic manifold 150 and is routed to the first pump 120 via a fifth fluid line 194, and the second pump 180 via the fifth fluid line 194 leading to a sixth fluid line 193 via intersection B, to the hydraulic fluid reservoir 130.

Figure 4:
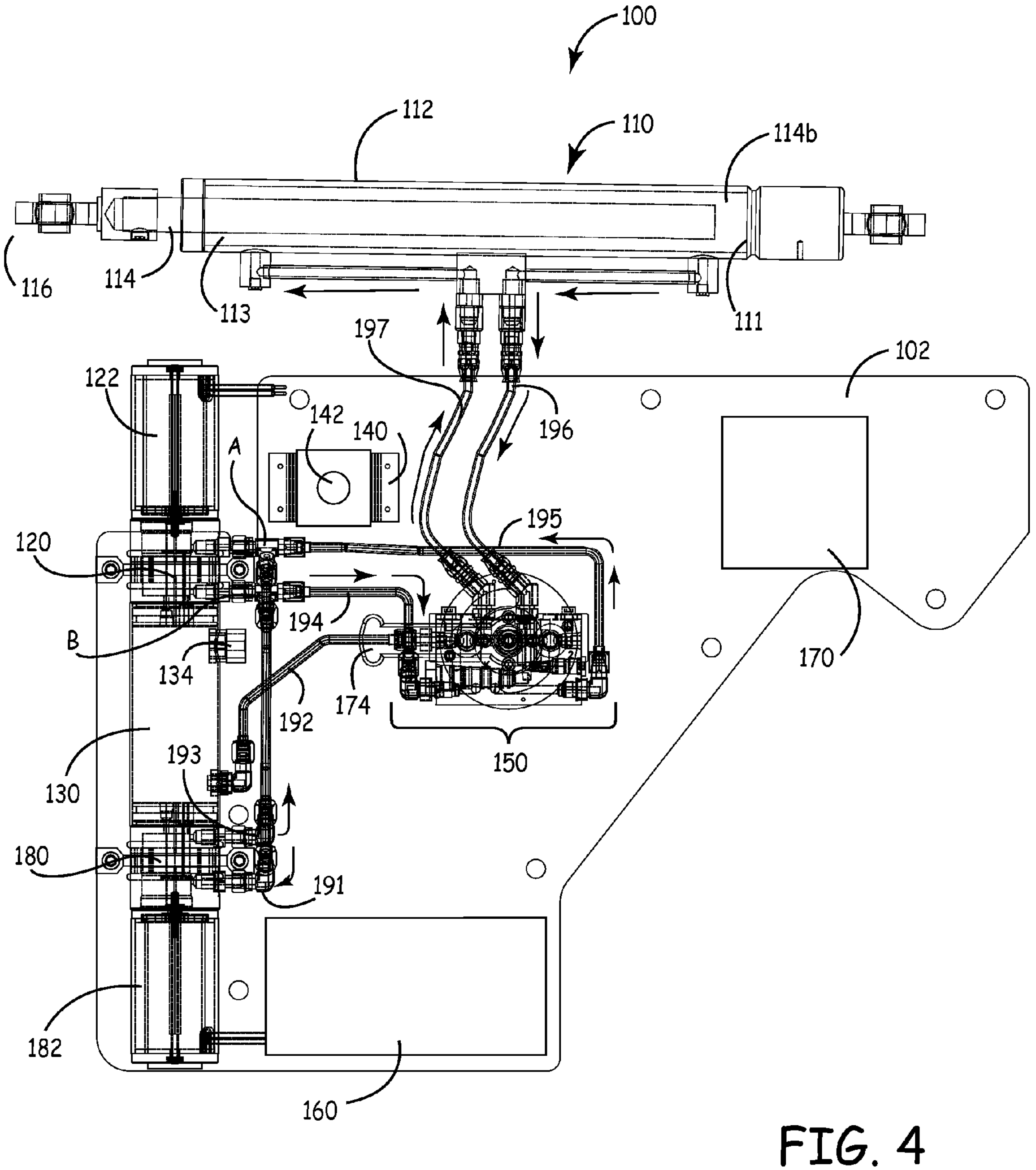
FIG. 4 is a schematic of fluid flow during a second operation according to one embodiment of the technology disclosed herein.

FIG. 4 is a schematic of fluid flow during a second operation consistent with the embodiment depicted in FIG. 1, FIG. 2, and FIG. 3. Fluid pressure on a second side 113 of the cylinder barrel retracts the piston rod 114 such that the structure attached to the distal end 116 of the piston rod 114 is moved relative to the structure attached to the hydraulic cylinder 110. Such operation of the system can be consistent with closing a vehicle door relative to a vehicle.

Consistent with the embodiment depicted in FIG. 4, a user provides input to the user interface, which determines a direction of operation of the first pump 120 and second pump 180. The user interface could be, for example, a "close" button and an "open" button, wherein a user engages the "open" button for fluid flow consistent with FIG. 3, and engages the "close" button for fluid flow consistent with the current FIG. 4. In the operation mode depicted in FIG. 4, the direction of operation of the first pump 120 and the second pump 180 will generally be opposite to the direction of operation of the first pump 120 and second pump 180 of FIG. 3, respectively.

The first motor 122 operates the first pump 120, which pumps fluid from the fluid reservoir 130 through a fifth fluid line 194 to the hydraulic manifold 150, to the fourth fluid line 197, in the direction of the arrows depicted. The fourth fluid line 197 leads to the second side 113 of the piston rod 114 of the hydraulic cylinder 110. The second motor 182 operates the second pump 180, which pumps fluid from the fluid reservoir 130 through a sixth fluid line 193 that merges with the fifth fluid line 194 at intersection B. (Intersection B is more clearly illustrated in FIG. 1.) Again, from the fifth fluid line 194 the hydraulic fluid is routed to the fourth fluid line 197 through the hydraulic manifold 150, leading to the second side 113 of the piston 114*b*. Fluid flow through the fourth fluid line 197 into the hydraulic cylinder on the second side 113 of the piston 114*b* causes retraction of the piston rod 114. The retraction of the piston rod 114 results in expulsion of hydraulic fluid from the first side 111 of the hydraulic cylinder barrel through the second fluid line 196 in the direction depicted by the arrow. The hydraulic manifold 150 routes hydraulic fluid flowing through the second fluid line 196 to the first hydraulic pump 120 through the first fluid line 195, and the second hydraulic pump 180 through the first fluid line leading to the third fluid line 191 via intersection A, to the hydraulic fluid reservoir 130.

The bypass system mentioned in the discussion of FIG. 1 and FIG. 2 can be engaged to allow free fluid flow between the hydraulic reservoir 130 and the hydraulic cylinder 110. In the current embodiment the bypass system is engaged through the bypass handle 174. Such an operating state allows manual movement of the second structure relative to the first structure without fluid pressure from the pumps assisting or opposing the movement, where a panel is attached to a first structure and the distal end of a piston rod is attached to the second structure, as explained in the description of FIG. 1 and FIG. 2, above. In an embodiment where the first structure is a vehicle body and the second structure is a vehicle door, this means that the vehicle door can be opened and closed relative to the vehicle body without the system 100 opposing the manual manipulation.

When the bypass system is engaged, fluid flow is diverted from the first fluid line 195 and the fifth fluid line 194 to the direct reservoir line 192. In one example embodiment, two valves, each of which is in mechanical communication with bypass handle 174, divert the first fluid line 195 and fifth fluid line 194, respectively, upon engagement of the bypass handle 174. This prevents the passing of hydraulic fluid to and from the hydraulic reservoir 130 through either of the pumps. The second fluid line 196 and the fourth fluid line 197 remain open such that hydraulic fluid can flow as needed between the second fluid line 196 and the fourth fluid line 197 in response to manual movement of the second structure relative to the first structure. The movement of the second structure relative to the first structure results in pressure changes between each side of the hydraulic cylinder, resulting in fluid flow.

In a variety of scenarios, manually moving the second structure relative to the first structure can result in pressure gradients requiring that hydraulic fluid either be returned or obtained from the hydraulic cylinder. One example system response is that the bypass lever 174 is in mechanical communication with a valve in the direct reservoir line 192, which releases in response to engaging the bypass lever 174. The direct reservoir line 192 generally incorporates a valve that, in regular operation of the system, prevents fluid flow unless the bypass system is engaged.

In various embodiments pressure-compensated flow controls are incorporated in the bypass system to control the rate at which the piston rod 114 extends and retracts based on limiting fluid flow, when the bypass system is activated. Such flow controls can be incorporated in the hydraulic manifold 150, in various fluid lines, and in other components. The flow controls are generally mechanical devices, such as valves, that at least partially restrict fluid flow in the system from exceeding a particular threshold. For example, when the hydraulic piston 114 is manually extended or refracted in the bypass mode, the flow control will limit the fluid flow such that the manual extension or retraction of the hydraulic piston cannot exceed a particular speed. Specifics of the flow controls can be modified for the particular needs of the system.

Figure 7:
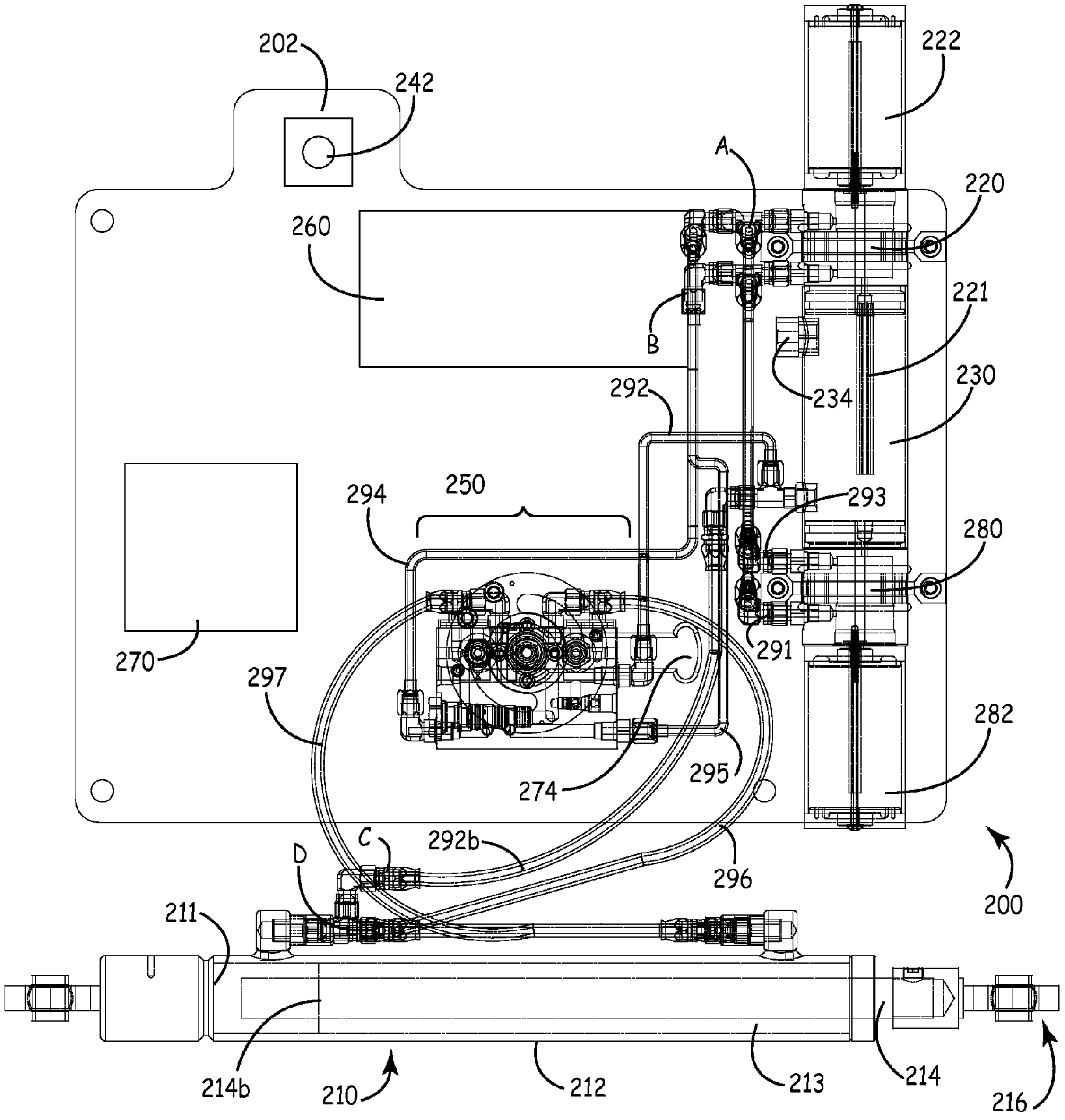
FIG. 7 is a front view of a second embodiment of the technology disclosed herein.

Also as mentioned above in the discussion of FIG. 1 and FIG. 2, "fluid stabilization" can be incorporated between the hydraulic cylinder 110 and hydraulic reservoir 130. "Fluid stabilization" generally prevents a vacuum from being formed when the bypass system is engaged by reducing or eliminating the tortuous path between the hydraulic cylinder 110 and hydraulic reservoir 130. Such a system is depicted in FIG. 7, and described in the discussion associated therewith. In various embodiments the bypass system 150 can be engaged from multiple locations. In the embodiment depicted in FIGS. 1-4, the bypass system is engaged inside a vehicle using the bypass handle 174. In one example, the bypass handle 174 is turned clockwise from the position shown in FIGS. 1-4 to an upright position to engage the bypass system, although the bypass handle could operate in many different ways to engage the bypass system. In other embodiments where the system 100 is used on a vehicle door, the bypass system can be engaged from inside the vehicle, outside the vehicle, or both, which will be described in more detail in the discussion of FIGS. 7-9, below.

Figure 5:
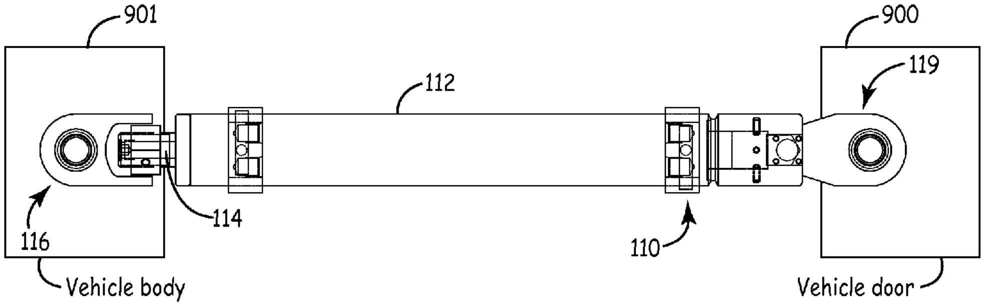
FIG. 5 is a top view of a hydraulic cylinder according to one embodiment of the technology disclosed herein.
Figure 6:
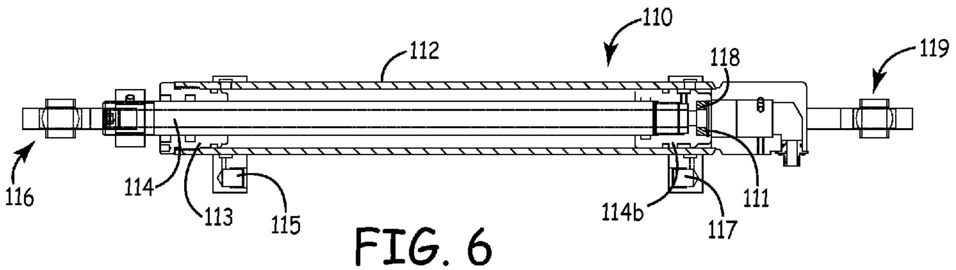
FIG. 6 is a cross-sectional front view of a hydraulic cylinder according to one embodiment of the technology disclosed herein.

FIG. 5 is a top view of a hydraulic cylinder according to one embodiment of the technology disclosed herein. FIG. 6 is a cross-sectional front view of the hydraulic cylinder of FIG. 5, according to one embodiment of the technology disclosed herein. The hydraulic cylinder 110 defines a cylinder barrel 112 and a piston rod 114. The hydraulic cylinder 110 is configured to be coupled to a first structure 900 at a first end 119, while the distal end 116 of the piston rod 114 is configured to be coupled to a second structure 901. For example, an opening may be provided at each end as illustrated. In various embodiments the first structure 900 is a vehicle door and the second structure 901 is a vehicle body. In one particular embodiment the first structure 900 is a panel, such as that described in the discussion of FIGS. 1-4, which is coupled to a vehicle door and the second structure is a vehicle body, although many other uses for the system are contemplated where the distal end 116 of the piston rod 114 and the first end 119 of the hydraulic cylinder 110 are attached to other types of components.

Components within steering systems for off-shore boat racing, systems for snow plow movement, log splitters, off-road and/or construction equipment, and other systems could also be attached to the first end 119 of the hydraulic cylinder 110 and the distal end 116 of the piston rod 114, depending on the particular application the system is incorporated within. In a first example system, the first structure 900 is a vehicle body and the second structure 901 is a plow blade. In a second example, the first structure 900 is a motor boat transom and the second structure 901 is selected from the group consisting of an outboard motor, an outdrive unit and a trim/tilt panel. In a third example, the first structure 900 is an I-beam of a log splitter machine and the second structure 901 is a log splitter wedge. In a fourth example, the first structure 900 is a vehicle body and the second structure 901 is selected from the group consisting of a steering wheel and vehicle wheel.

In any of the embodiments discussed herein, it is possible for the first structure to be exchanged with the second structure, so that the first structure is attached to the distal end 116 of the piston rod 114 and the second structure is attached to the first end 119 of the hydraulic cylinder 110.

The cylinder barrel 112 defines a first fluid port 117 and a second fluid port 115 that are configured to allow the flow of fluid. Such ports 117, 115 allow the hydraulic cylinder 110 to be in fluid communication with a fluid reservoir 130 through the hydraulic fluid lines 191-197 (described in the discussion of FIGS. 1-4). The fluid reservoir can be a dynamic fluid reservoir, which will be described in more detail in the discussion of FIGS. 10-20. To extend the piston rod 114, fluid is pumped from the fluid reservoir through the first fluid port 117 and into the first side 111 of the cylinder barrel 112, which provides fluid pressure against one side of a piston on the piston rod 114, to force the piston rod 114 to extend from the cylinder barrel 112.

The hydraulic cylinder 110 can include a transducer that can indicate the position of the piston rod 114 relative to the cylinder barrel 112 to the controller. The transducer can incorporate a magnet 118 in the piston rod 114 and a magnet sensor (not shown) at the end of the cylinder barrel 112, for example. The hydraulic cylinder 110 can further include a linear displacement transducer (LDT) sensor that can generate and/or transmit a signal indicating the position of the piston rod within the cylinder barrel based on the measurement of voltage changes resulting from the distance of the magnet 118 from the end of the piston rod 114. A user interface can display the position of the first structure and the second structure relative to each other, for example, such as whether a vehicle door is open or closed.

Second Embodiment

Figure 8:
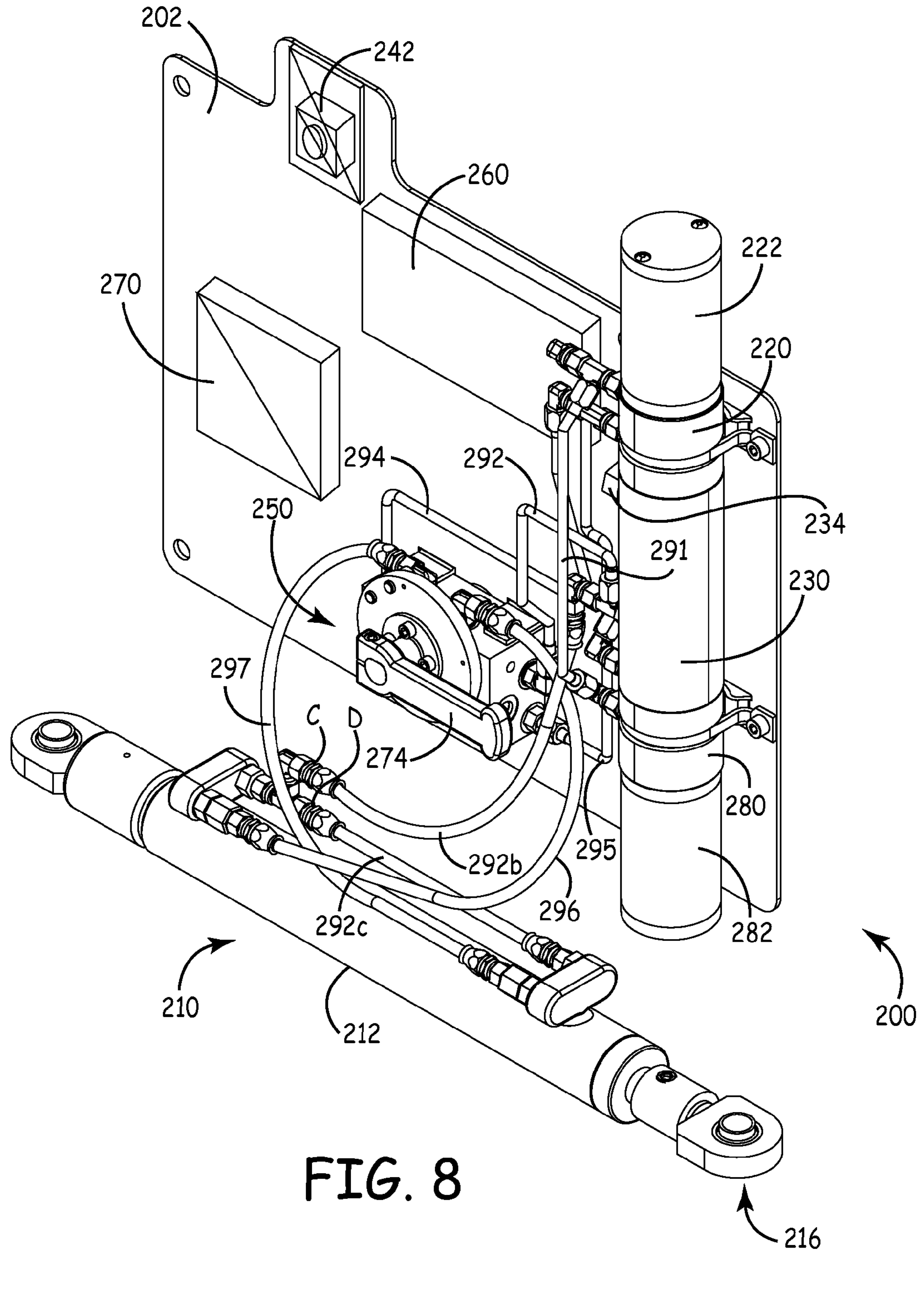
FIG. 8 is a front perspective view of the second embodiment of the technology disclosed herein.
Figure 9:
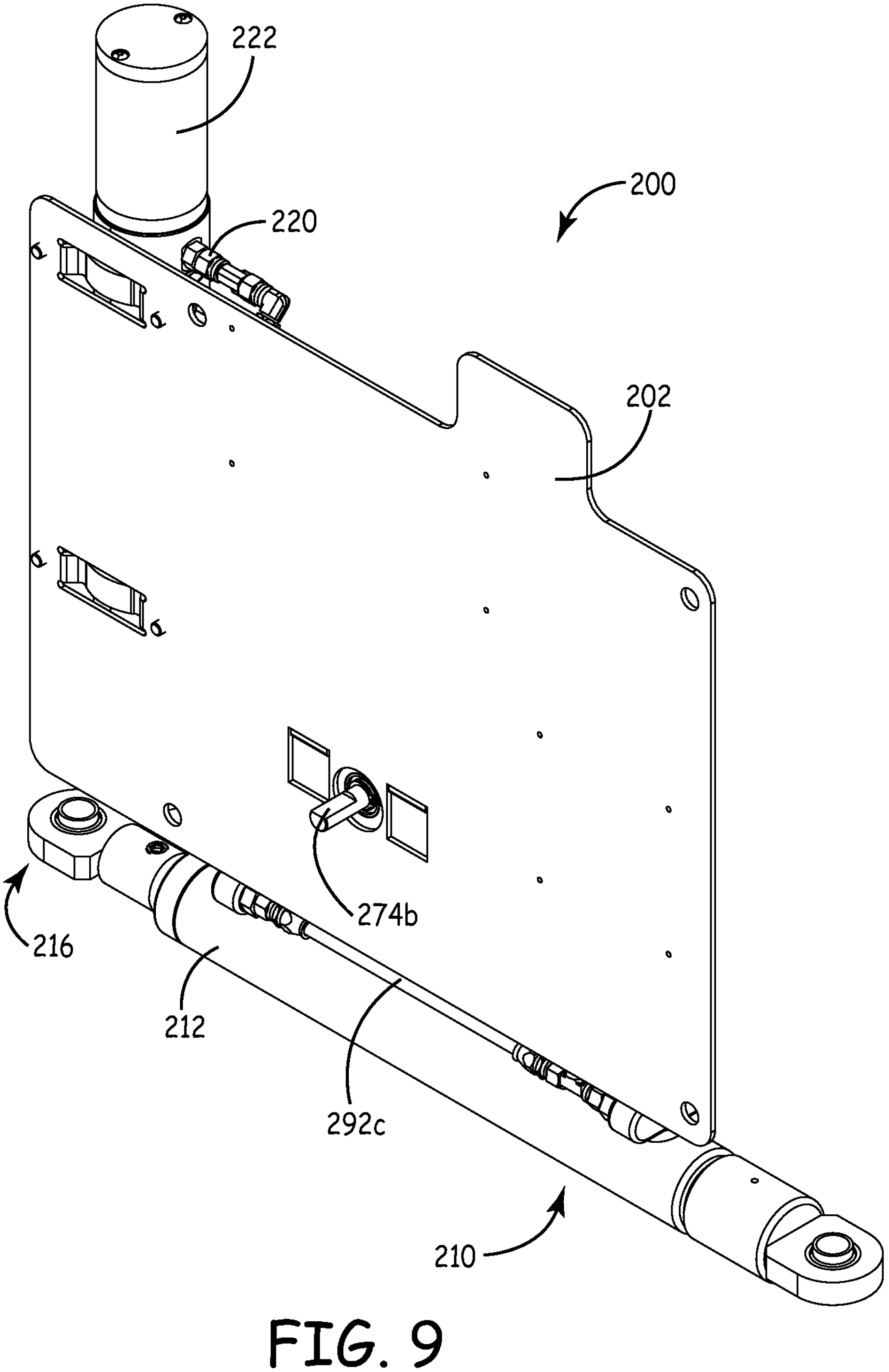
FIG. 9 is a back perspective view of the second embodiment of the technology disclosed herein.

FIG. 7 is a front view of another embodiment of the technology disclosed herein. FIG. 8 is a front perspective view of the embodiment depicted in FIG. 7, and FIG. 9 is a back perspective view of another embodiment depicted in FIG. 7. Generally FIGS. 7-9 depict a hydraulic system 200 that can be used for opening and closing a first structure, such as a door, relative to a second structure. The system 200 broadly has a hydraulic cylinder 210, a first hydraulic pump 220, a second hydraulic pump 280, a first motor 222, a second motor 282, a hydraulic reservoir 230, and a hydraulic manifold 250 with a bypass lever 274 mounted on a panel 202.

The panel 202 is generally for mounting components of the hydraulic system 200 thereon and can be consistent with the panel described in the description of FIGS. 1 and 2, above. The panel 202 can have a variety of shapes and sizes, and it is noted that the panel 202 in the current embodiment is, indeed, a different shape than that of the panel in FIGS. 1-4. The panel 202 can be constructed to have the shape and size conducive to mounting it to a particular structure, and can have various cut-outs to reduce the weight of the panel 202. As mentioned above, the panel 202 is generally mounted to a first structure. The first structure can be a vehicle door in multiple embodiments. In some of those embodiments, the panel is mounted on the interior side of a vehicle door. As visible in FIG. 9 in particular, the panel 202 defines an opening to accommodate a bypass lever shaft **274*b* such that the bypass lever 274 can be engaged from either side of the panel 202. The bypass lever shaft 274*b* can be coupled to another bypass lever from the back of the panel 202**.

The hydraulic cylinder 210 is a cylinder barrel 212 having a piston rod 214. The piston rod 214 has a distal end 216 that is configured to attach to a second structure. The cylinder barrel 212 receives hydraulic fluid on either side of a piston **214*b* attached to the piston rod 214, which moves the piston rod 214 between extended and retracted positions relative to the hydraulic cylinder 210 (and, therefore, the rest of the system 200 including the panel). The hydraulic cylinder 200 can be in communication with a transducer that indicates the position of the piston rod 214 relative to the cylinder barrel 212, as described in the discussion of FIGS. 5 and 6**, above.

The embodiment of FIGS. 7 and 8 is configured so that the fluid connections to the hydraulic cylinder are positioned on a top surface of the hydraulic cylinder 210, providing a self-bleeding feature. The embodiment of FIGS. 7 and 8 can include self-bleeding valves (not shown) at the fluid line connection points. In the event that gas is present in system, the self-bleeding valves allow gas to be released from the cylinder such that the gas does not interfere with operation of the system. Such valves substantially prevent entry of gas into the hydraulic cylinder.

The hydraulic reservoir 230 defines a compartment that is in fluid communication with the first hydraulic pump 220 and second hydraulic pump 280 through fluid lines 291-297. An air valve 234 is defined by hydraulic reservoir 230 and can be configured to allow one-way airflow into the hydraulic reservoir 230.

The first pump 220 and second pump 280 and first motor 222 and second motor 282 can be the same or similar to those depicted and described in the embodiments depicted in FIGS. 1-4. Reference numbers that share the last two digits in common are generally similar throughout the application, such as the first pump 120 of FIG. 1 and the first pump 220 of FIG. 7. The description of the operation of the system and the components of the system shown in FIGS. 1-6 generally applies to the system of FIGS. 7-9, except as specifically discussed.

The first motor 222 is adjacent to, and in operative communication with, the first hydraulic pump 220 that is on a top surface of the reservoir 230 and is configured to pump hydraulic fluid to and from the hydraulic cylinder 210, thereby moving the piston rod 214 between the extended and retracted positions. The first hydraulic pump 220 includes an intake tube 221 extending down into the hydraulic reservoir 230 below the level of the hydraulic fluid within the hydraulic reservoir 230.

Likewise, the second motor 282 is adjacent to, and in operative communication with, the second hydraulic pump 280 positioned adjacent to a bottom surface of the reservoir 230 and configured to pump hydraulic fluid to and from the hydraulic cylinder 210, also moving the piston rod 214 between the extended and retracted positions. An opening in the bottom of the hydraulic reservoir 230 allows fluid to be drawn out by the second hydraulic pump 280.

The power source 270 is operatively connected to the first hydraulic pump 220 through the first motor 222 and the second hydraulic pump 280 through the second motor 282. The power source provides a DC voltage in various embodiments. In some embodiments the power source can provide AC voltage. In at least one embodiment multiple power sources can be incorporated into the system, providing either AC voltage or DC voltage. Suitable power sources can be batteries, solar panels, a vehicle alternator, vehicle batteries, or many other power sources.

Similar to the system depicted in FIGS. 1-4, a user provides input to a user interface such as a button, lever, dial, or the like, which determines the direction of operation of the first pump 220 and second pump 280. Such user interface can have a variety of locations and configurations. In one embodiment the user interface consists of two buttons allowing two operations. In a first operation the pump(s) operate in a first direction, and in a second operation the pump(s) operate in a second direction.

In the first operation of this embodiment the first motor 222 operates the first pump 220, which pumps fluid from the fluid reservoir 230 through a first fluid line 295, and the second motor 282 operates the second pump 280, which pumps fluid from the fluid reservoir 230 through a third fluid line 291 that merges with the first fluid line 295 at intersection A. From intersection A, fluid is pumped by the first pump 220 and the second pump 280 through the hydraulic manifold 250, and then routed to a second fluid line 296 leading to the first side 211 of the piston **214*b* of the hydraulic cylinder 210. Fluid pressure on a first side 211 of the piston 214*b* extends the piston rod 214 such that the structure attached to the distal end 216 of the piston rod 214 is moved relative to the cylinder barrel 212. As the piston 214*b* moves, it pushes hydraulic fluid from the second side 213 of the piston rod 214, through a fourth fluid line 297. From the fourth fluid line 297 the fluid passes through the hydraulic manifold 250 and routed to the first pump 220 via a fifth fluid line 294, and the second pump 280 via the fifth fluid line 294 leading to a sixth fluid line 293 via intersection B, to the hydraulic fluid reservoir 230. This operation of the system 200** as described can be consistent with moving a first structure away from a second structure. In one embodiment it is consistent with opening a vehicle door relative to a vehicle.

In the second operation of this embodiment the first motor 222 operates the first pump 220, which pumps fluid from the fluid reservoir 230 through a fifth fluid line 294, and the second motor 282 operates the second pump 280, which pumps fluid from the fluid reservoir 230 through a sixth fluid line 293 that merges with the fifth fluid line 294 at intersection B. From intersection B, fluid is pumped by the first pump 220 and the second pump 280 through the hydraulic manifold 250 to the fourth fluid line 297, which leads to the second side 213 of the piston **214*b* of the hydraulic cylinder 210. Fluid pressure on a second side 213 of the piston 214*b* retracts the piston rod 214 such that the structure attached to the distal end 216 of the piston rod 214 is moved relative to the structure attached to the hydraulic cylinder 210. As the piston 214*b* moves, it pushes hydraulic fluid from the first side 211 of the piston 214*b*, through the second fluid line 296. The hydraulic manifold 250 routes hydraulic fluid flowing through the second fluid line 296 to the to the first pump 220 via the first fluid line 295, and the second pump 280 via the first fluid line 295 leading to the third fluid line 291 via intersection A, to the hydraulic reservoir 230**. Such operation of the system can be consistent with closing a vehicle door relative to a vehicle.

As mentioned above, a bypass system is incorporated into the system 200 to allow free fluid flow between the hydraulic reservoir 230 and the sides 211, 213 of the hydraulic cylinder 210. In the current embodiment the bypass system would be engaged through the bypass handle 274 or through other means that can be in communication with the bypass lever shaft **274*b***. In one embodiment, the bypass handle is moved counter-clockwise to engage the bypass system.

Contrary to the embodiment depicted in FIGS. 1-4, the embodiment of FIGS. 7-8 incorporates a fluid stabilization system as previously mentioned, which includes alternate fluid line **292*c* and alternate fluid return line 292*b*. When engaged, the bypass system diverts fluid flow through the fluid lines 294, 295 that are coupled to the hydraulic manifold 250 through the use of mechanical valves in the manifold, for example. The alternate fluid line 292*c* is present between the two sides of the hydraulic cylinder 210, so that fluid can flow more quickly between the two sides of the cylinder when the piston rod is being moved manually in a bypass mode. Compared to the bypass mode of the embodiment of FIGS. 1-4, the alternate fluid line 292*c* eliminates the otherwise tortuous fluid path through the fluid manifold when the system is in bypass mode. In addition, the alternate fluid return line 292*b* allows fluid flow directly between the hydraulic cylinder 210 and the hydraulic reservoir 230**, without passing through the manifold, so that excess fluid can be returned to the reservoir and required fluid can be drawn from the reservoir more readily as needed when the system is in bypass mode.

In normal operation, one or more valves prevent fluid flow through alternate fluid line **292*c* and alternate fluid return line 292*b*. But in bypass mode, pressure gradients are created within the system by manually extending and retracting the hydraulic cylinder and those pressure gradients release one or more valves disposed in the alternate fluid line 292*c* and the alternate fluid return line 292*b*. A first valve can be disposed at an intermediate point C on alternate fluid return line 292*b*, and a second valve can be disposed at an intermediate point D on alternate fluid line 292*c***. Other configurations and positions for valves are also possible without deviating from the scope of the technology disclosed herein.

This particular configuration of the bypass system can prevent a vacuum from being formed when the bypass system is engaged between the hydraulic cylinder 210 and hydraulic reservoir 230. Such a vacuum can provide opposing forces to manual manipulation of the piston rod 214.

The bypass lever shaft **274*b* can further pass through the first structure to which the panel 202 is mounted, such that the bypass system can be engaged from either side of the first structure. In embodiments where the system 200 is used on a vehicle door, the bypass system can be engaged from both inside and outside the vehicle by virtue of the bypass lever shaft 274*b* that passes through the panel 202. When engaged, the bypass allows manual movement of the second structure relative to the first structure without fluid pressure opposing the movement, where the panel 202 is attached to a first structure and the distal end 216 of the piston rod is attached to the second structure, as explained in the description of FIG. 1 and FIG. 2, above. In an embodiment where the first structure is a vehicle body and the second structure is a vehicle door, this means that the vehicle door can be opened and closed relative to the vehicle body without the system 200** forces opposing the manual manipulation.

Contrary to the embodiment depicted in FIGS. 1-4, the current embodiment incorporates fluid stabilization as previously described. Alternate fluid return lines **292*b* and 292*c* are incorporated between the hydraulic cylinder 210 and hydraulic reservoir 230, which eliminate the otherwise tortuous fluid return path through the fluid manifold 250. This prevents a vacuum from being formed when the bypass system is engaged between the hydraulic cylinder 210 and hydraulic reservoir 230. Such a vacuum can provide opposing forces to manual manipulation of the piston rod 214**.

The controller 260 and emergency stop 242 are generally similar or the same to that previously described in the description of FIGS. 1 and 2, above. The emergency stop 242 is in operable communication with the first motor 222 and the second motor 282 and has an user-interface such as a button or lever that, when engaged, immediately stops operation of the motors 222, 282. The controller 260 interfaces various electrical components of the system, and can generally have a variety of configurations, known and unknown in the art, without deviating from the scope of the technology disclosed herein.

The structure of this particular embodiment is very similar to the embodiment described in the discussion of FIGS. 1 and 2, above. Although not limited to such, in this embodiment, however, the bypass system extends through a door of a vehicle so as to be accessed from the outside of the vehicle and the bypass system incorporates fluid stabilization. System depth measurements can be similar or the same to those described in the discussion of FIG. 1-4, above. It also can be possible for components to be repositioned on the panel 202 based on user-determined needs.

Dynamic Fluid Reservoir Embodiment

Figure 10:
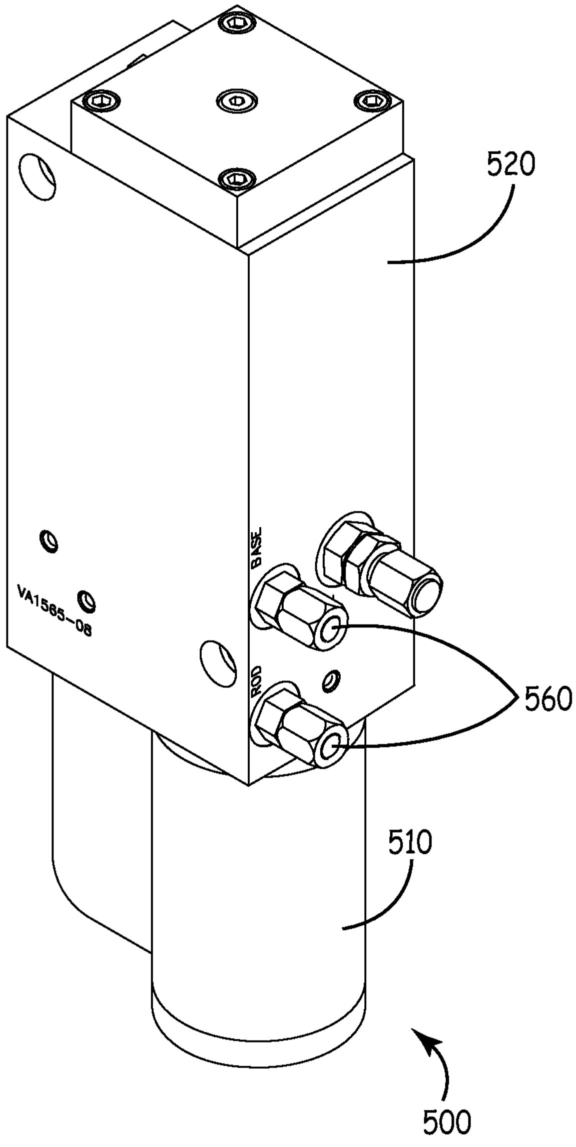
FIG. 10 is a perspective view of a dynamic fluid reservoir embodiment of the technology disclosed herein.
Figure 11:
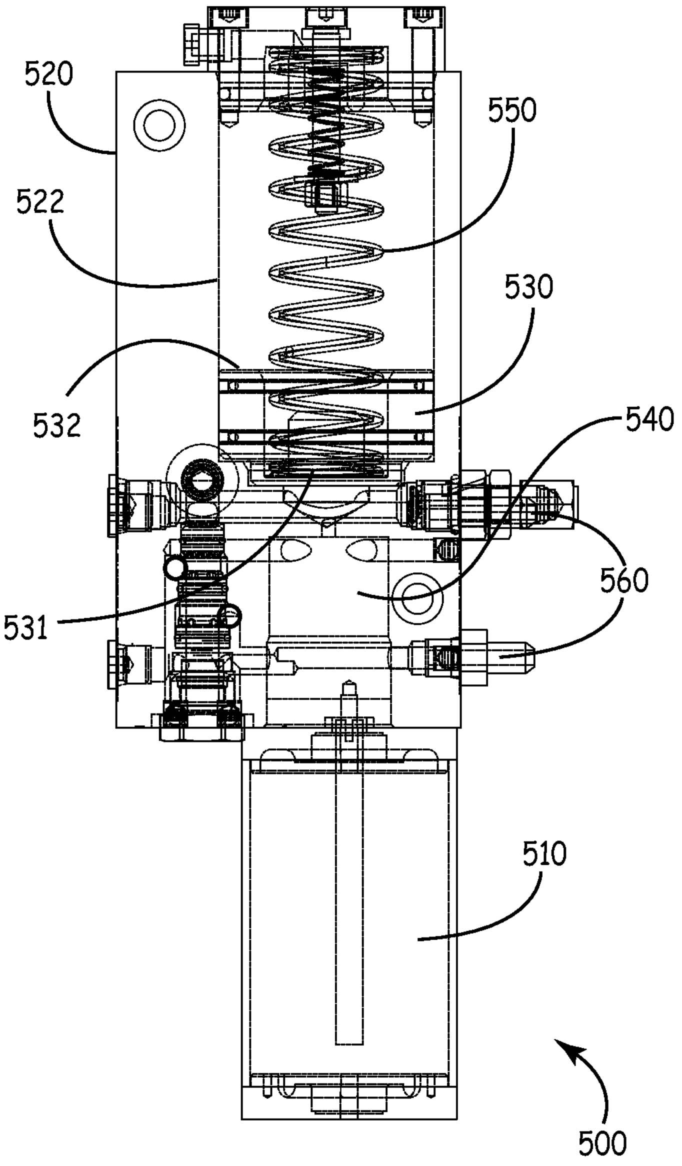
FIG. 11 is a side view, with interior components shown in broken lines, of the dynamic fluid reservoir embodiment of the technology disclosed herein.

FIG. 10 is a perspective view of a hydraulic system having a dynamic fluid reservoir according to one embodiment of the technology disclosed herein. FIG. 11 is a side view of a dynamic fluid reservoir according the embodiment depicted in FIG. 10, with internal components shown in broken lines. The term dynamic fluid reservoir is intended to mean that the reservoir volume varies to accommodate the volume of fluid within the reservoir, and that pressure is applied to the fluid within the reservoir. A dynamic fluid reservoir can also be referred to as a “positive pressure” fluid reservoir, which is descriptive of the pressure on hydraulic fluid within the fluid reservoir. As a result of the pressure on the fluid, the reservoir can be operated in any orientation and under forces of acceleration, as opposed to a standard gravity-fed hydraulic reservoir which contains a volume of hydraulic fluid and a volume of air.

If a gravity-fed hydraulic reservoir is used in an application where it is oriented at an angle, upside down, or subjected to acceleration forces, it is possible for air to be drawn into the hydraulic cylinder. As a result, the hydraulic cylinder will not respond reliably due to the compressibility of the air. For example, if the positive pressure system is used in a door opener for a vehicle, and the vehicle is parked on rough terrain or on sloped terrain, the bottom surface of a gravity-fed reservoir could be at an angle of 45 degrees or more to the horizontal. As a result, the hydraulic fluid could rest on one side of the reservoir and the intake openings for the pump may be exposed to air. Similarly, without a positive pressure system, air can be drawn into the system when significant acceleration forces are applied to the hydraulic liquid, such as when a vehicle or boat turns at high speeds. This can cause the hydraulic fluid to slosh to one side of the reservoir. A dynamic fluid reservoir can alleviate this concern in some embodiments.

One example of where a hydraulic system incorporating a dynamic fluid reservoir could avoid the difficulties of significant acceleration forces or a tilted orientation applied to a gravity-fed reservoir is in a high-speed motor boat. A trim/tilt panel, an outboard motor, or an outdrive unit of a motor boat can be hydraulically moved relative to a boat transom using such a system. Another example is a log splitter machine where a log splitter wedge is hydraulically moved relative to an I-beam of the machine. Yet another example is hydraulically moving a plow blade relative to a plow vehicle frame in a plow vehicle.

The dynamic fluid reservoir 500 of the current embodiment has a cylinder barrel 520 with an interior wall 522 and a reservoir piston 530 that is positioned within the cylinder barrel 520 and forms a sealing engagement with the interior wall 522 of the reservoir cylinder barrel 520. A motor 510 is in operative communication with a hydraulic pump 540 that can transfer fluid through fluid ports 560 and can be consistent with motor and pump configurations already presented herein. The pump 540 is a bi-directional pump that can activated to pump fluid out of either of the two fluid ports 560. The cylinder barrel 520 is configured to withstand forces exerted by the pressurized fluid in response to the system and, in one embodiment, is constructed of an aluminum or steel material.

The reservoir piston 530 is positioned within the cylinder barrel 520 and forms a sealing engagement with the interior wall 522 of the reservoir cylinder barrel 520. The reservoir piston 530 has a first side 531 and a second side 532, where the first side 531 of the reservoir piston defines a boundary of the fluid compartment and hydraulic fluid is present on a first side 531 of the reservoir piston. A spring 550 is present on a second side 532 of the reservoir piston 530 to apply pressure to the fluid in the reservoir via the reservoir piston 530. In such an embodiment, the spring 550 can exert about 14 lbs of pressure on the reservoir piston 530, or about 56 psi. In FIG. 11, the spring 550 is fully extended so there is no fluid in the cylinder barrel. In another embodiment, compressible gas is present on the second side of the reservoir piston, as described below in the discussion of FIG. 12. Examples of compressible gasses that can be used include air, nitrogen, carbon dioxide, or argon. Application of pressure to the piston 530 by either the spring or compressible gas or other arrangements substantially eliminates air in the hydraulic reservoir, which may allow for orientation-independent operation of the hydraulic reservoir 500.

The hydraulic system 500 can be used for opening and closing a door relative to a structure, but can also be used for other applications. The dynamic reservoir hydraulic system 500 is particularly useful in applications where the orientation of the reservoir may change during operation. Some examples of useful applications include steering systems for off-shore race boats, systems for moving snow plows relative to a vehicle, log splitters, and many others.

Figure 12:
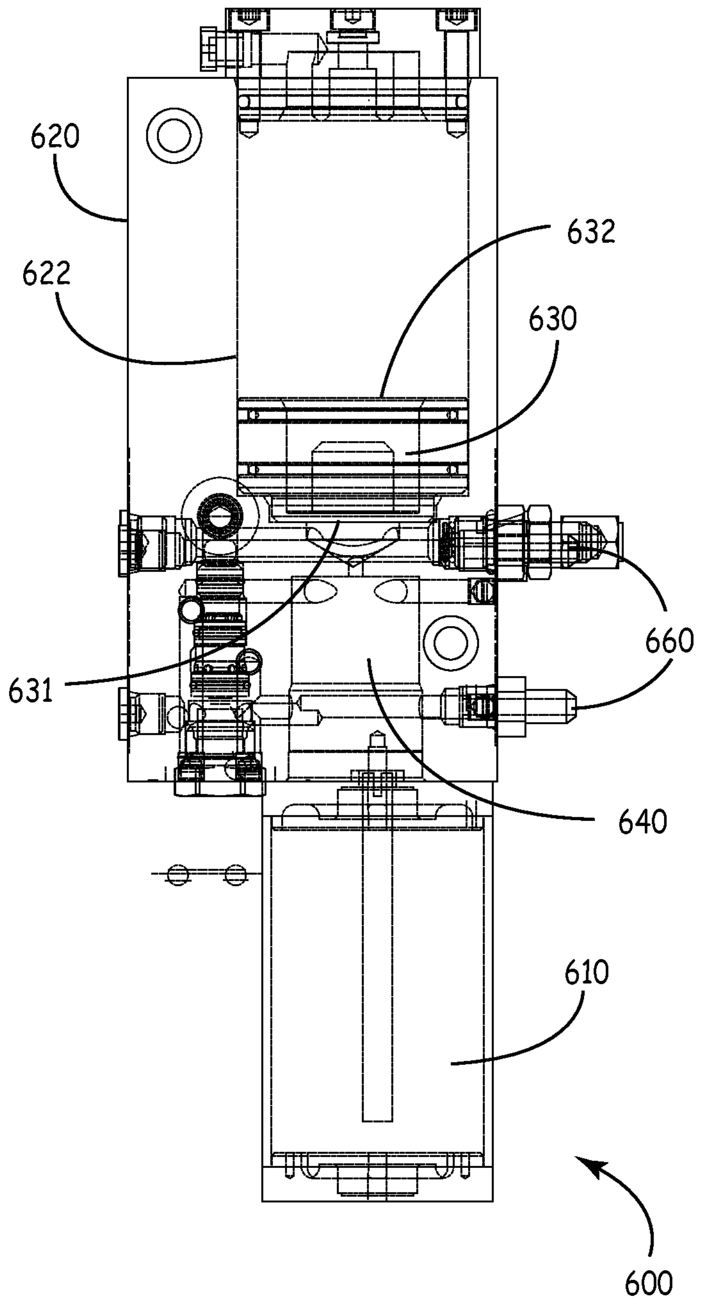
FIG. 12 is a cross sectional view of a second dynamic fluid reservoir embodiment of the technology disclosed herein.

FIG. 12 is a side view of a hydraulic system 600 having a dynamic fluid dynamic fluid reservoir according to one embodiment of the technology disclosed herein, with internal components shown in broken lines. The dynamic fluid reservoir system 600 of the current embodiment, similar to the embodiment depicted in the previous figure, has a cylinder barrel 620 with an interior wall 622 and a reservoir piston that is positioned within the cylinder barrel 620 and forms a sealing engagement with the interior wall 622 of the reservoir cylinder barrel. A motor 610 is in operative communication with a hydraulic pump 640 that can transfer fluid through fluid ports 660 and can be consistent with motor and pump configurations already presented herein. The pump 640 is a bi-directional pump that can be activated to pump fluid out of either of the two fluid ports 660. The cylinder barrel 620 is configured to withstand force exerted by the pressurized fluid in response to the system and, in one embodiment, is constructed of an aluminum or steel material.

The reservoir piston 630 positioned within the cylinder barrel 620 and forms a sealing engagement with the interior wall 622 of the reservoir cylinder barrel 620. The reservoir piston 630 has a first side 631 and a second side 632, where the first side 631 of the reservoir piston 630 defines a boundary of the fluid compartment 640 and hydraulic fluid is present on a first side 631 of the reservoir piston 630. Compressible gas is present on the second side 632 of the reservoir piston 630 that exerts a force on the fluid, via the piston 630. Such a configuration substantially eliminates air in the hydraulic reservoir 600, which may allow for position-independent operation of the hydraulic reservoir 600.

Figure 13:
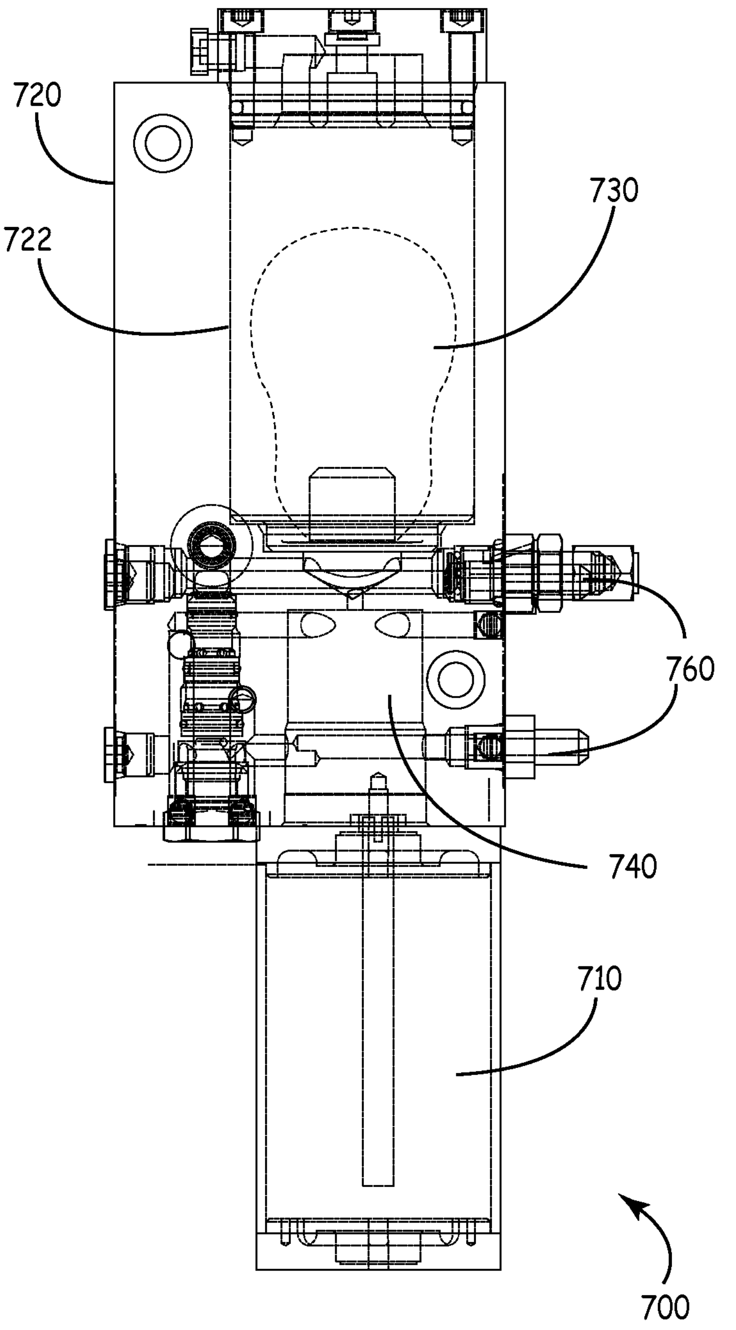
FIG. 13 is a cross sectional view of a third dynamic fluid reservoir embodiment according to one embodiment of the technology disclosed herein.

FIG. 13 is a side view of a dynamic fluid reservoir system 700 according to one embodiment of the technology disclosed herein, with internal components shown in broken lines. A cylinder barrel 720 has an interior wall 722. A deformable bladder 730 is contained within the barrel 720, and hydraulic fluid is contained within the bladder 730. The bladder 730 can be constructed of a variety of materials, but in various embodiments can be constructed of rubber, plastic, nitrile rubber, latex, and other elastomeric compounds. A motor 710 is in operative communication with a hydraulic pump 740 that can transfer fluid from the bladder 730 through fluid ports 760 and can be consistent with motor and pump configurations already presented herein. The pump 740 is a bi-directional pump that can be activated to pump fluid out of either of the two fluid ports 760. Within the cylinder barrel 720 but outside of the bladder 730, a compressible gas may be present.

Dynamic Fluid Reservoir Embodiment with Two Pumps

Figure 14:
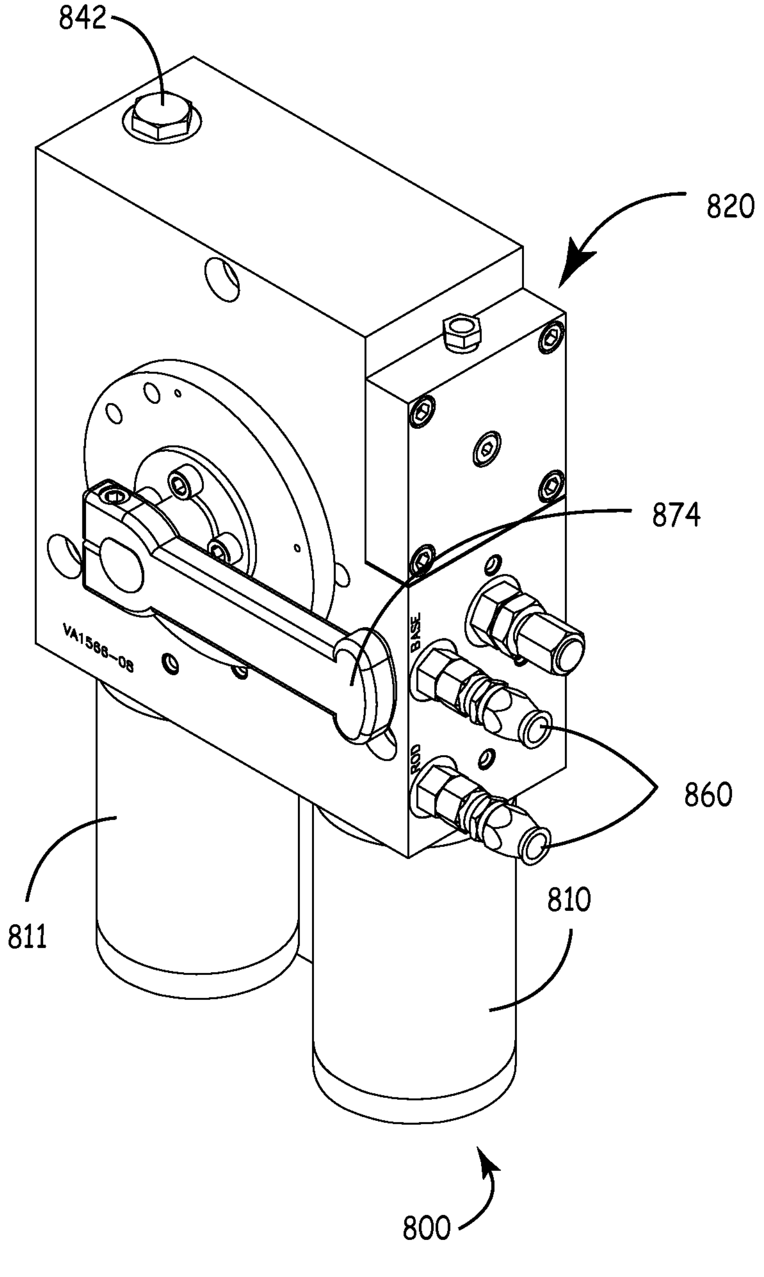
FIG. 14 is a perspective view of a fourth dynamic fluid reservoir embodiment of the technology disclosed herein.
Figure 15:
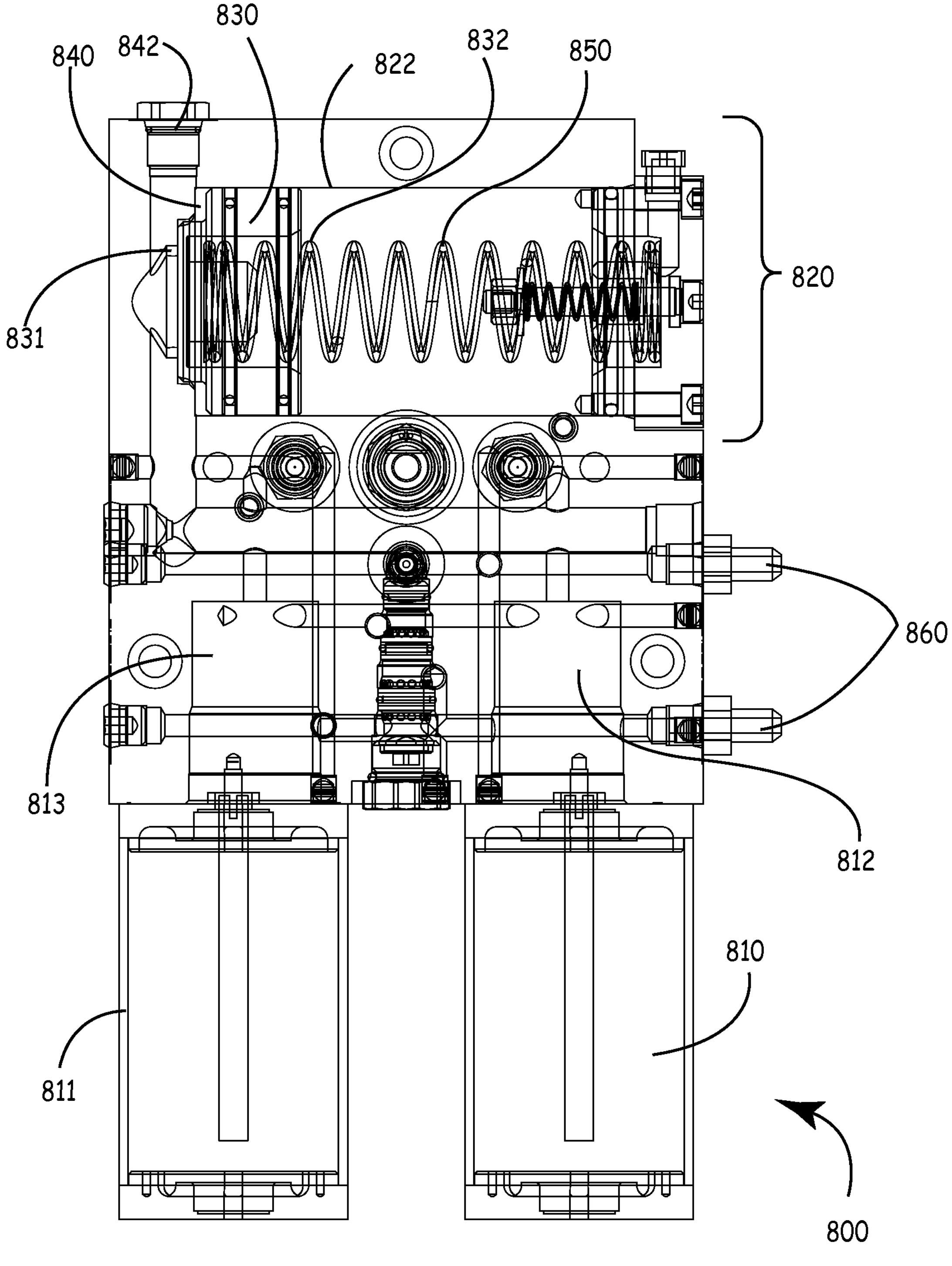
FIG. 15 is a front view of the dynamic fluid reservoir of FIG. 14, with internal components depicted, according to one embodiment of the technology disclosed herein.

FIG. 14 is a perspective view of a dynamic fluid reservoir hydraulic system 800 according to one embodiment of the technology disclosed herein. FIG. 15 is a side view of a dynamic fluid reservoir of FIG. 14 according to one embodiment of the technology disclosed herein, with internal components shown therein in broken lines. The embodiment depicted in FIG. 14 and FIG. 15 incorporates a first motor 810 and a second motor 811 that operate a first pump 812 and second pump 813, respectively, to pump fluid through fluid ports 860, in fluid communication with a fluid compartment 840 defined by a cylinder barrel 820 having an interior wall 822. The cylinder barrel 820 can be similar to the embodiments depicted in FIGS. 10-13, incorporating a spring on a second side of a piston, compressible air on a second side of a piston, or a bladder. In the current embodiment of FIGS. 15-16, the cylinder barrel 820 incorporates a spring 850 on the second side 832 of a piston 830.

The pumps 812, 813 are bi-directional pumps that can be activated to pump fluid in one of two directions. A manifold structure within the system 800 directions the two outputs from each of the two pumps to one of the fluid ports 860.

Dynamic Fluid Reservoir System on a Panel

Figure 16:
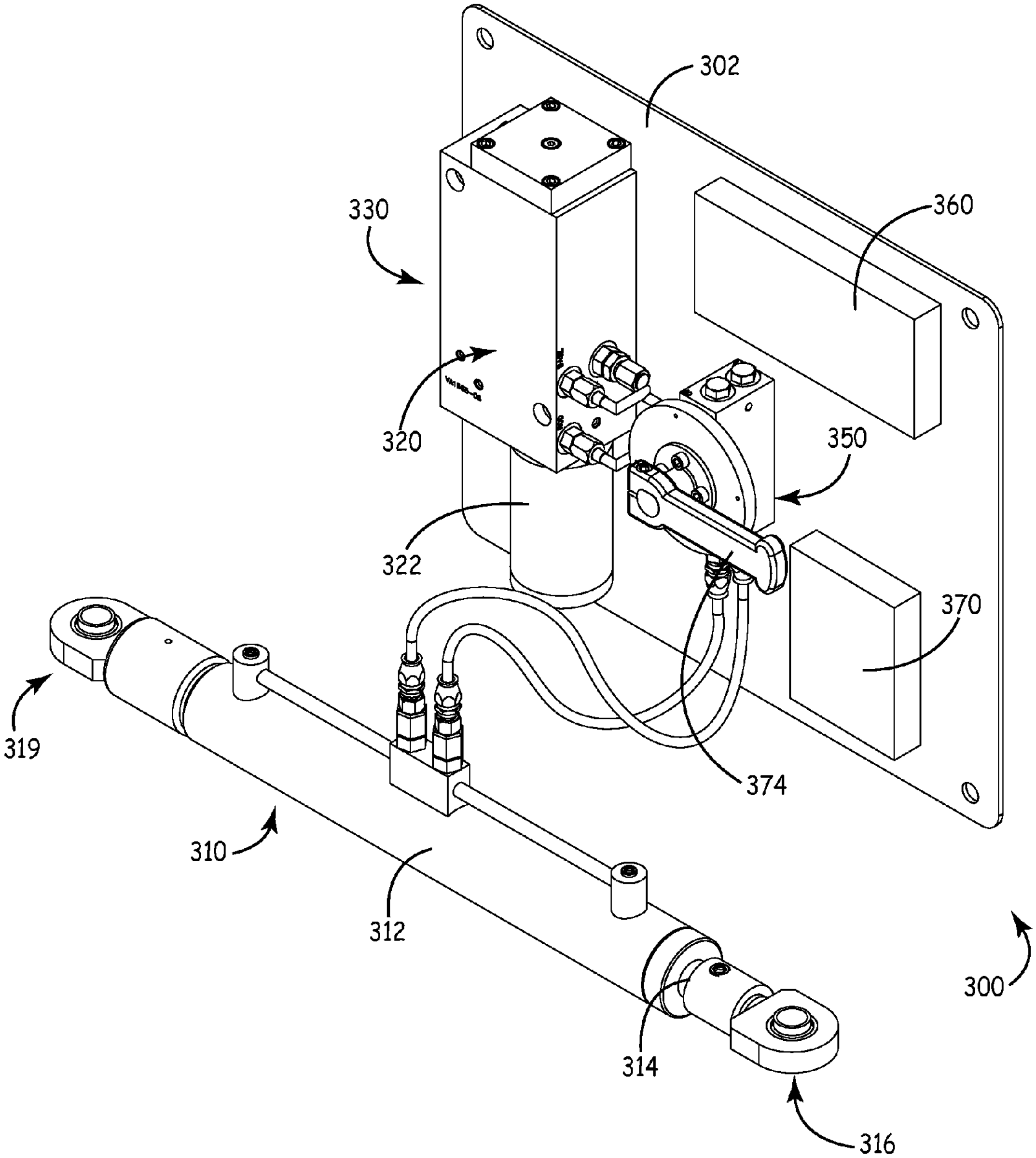
FIG. 16 is a front perspective view of another embodiment of the technology disclosed herein.
Figure 17:
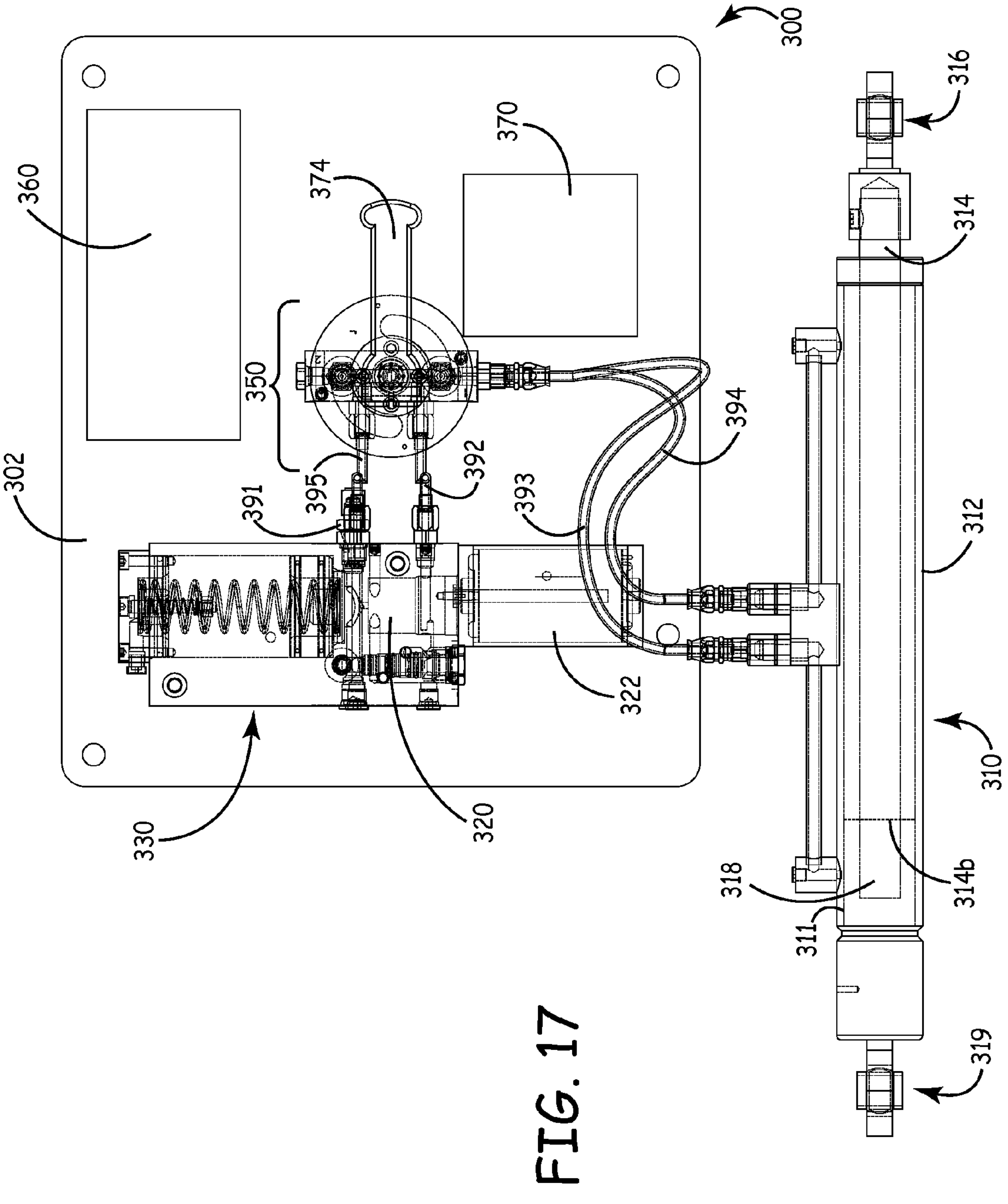
FIG. 17 is a front view of the embodiment depicted in FIG. 16, with interior components shown with broken lines.

FIG. 16 is a perspective view of one embodiment 300 of the technology disclosed herein. FIG. 17 is a front view of the embodiment depicted in FIG. 16, with internal components shown with dotted lines. The current embodiment can have some overlapping components with previously-depicted embodiments of FIG. 1 and FIG. 7. The hydraulic system 300 can be used for opening and closing a door relative to a structure, but can also be used for other applications. The dynamic reservoir hydraulic system 300 is particularly useful in applications where the orientation of the reservoir may change during operation. Some examples of useful applications include steering systems for off-shore race boats, systems for moving snow plows relative to a vehicle, log splitters, and many others.

The system includes a hydraulic cylinder 310 in fluid communication with a hydraulic reservoir 330. A panel 302 is generally for mounting certain components of the system 300 thereon. Mounted components include, in one embodiment, a hydraulic reservoir 330, a first hydraulic pump 320 for pumping fluid from the hydraulic reservoir 330 to the hydraulic cylinder 310 (and from the hydraulic cylinder 310 to the hydraulic reservoir 330), a first motor 322 operatively connected to the first pump 320, a power source 370 in communication with the first motor 322, and a hydraulic manifold 350. The hydraulic fluid lines 391-395 provide pathways for fluid travel. A controller 360 interfaces with system electronic components.

Similar to the system depicted in FIG. 1, the hydraulic cylinder 310 is a cylinder barrel 312 having a piston rod 314. The piston rod 314 has a distal end 316 that is configured to attach to a second structure, and the cylinder barrel 312 is configured to attach to a first structure at a second end 319. The cylinder barrel 312 receives hydraulic fluid on either side of a piston **314*b* attached to the piston rod 314, which moves the piston rod 314 between extended and retracted positions relative to the hydraulic cylinder 310 (and, therefore, relative to the rest of the system 300 including the panel). The hydraulic cylinder 310 can include a transducer 318 that can indicate the position of the piston rod 314 relative to the cylinder barrel 312 when the transducer interfaces with the controller. The hydraulic cylinder 310 can further include a linear displacement transducer (LDT) that can generate and/or transmit a signal to the controller indicating the position of the piston rod 314 within the cylinder barrel 312. A visual signal of such can be displayed on a user-interface or the controller 360, for example. Such a configuration can allow a user to know the position of the distal end 316 of the piston rod 314 relative to the cylinder barrel 312**.

A bypass system engaged by a bypass lever 374 is incorporated in the current embodiment and is very similar to the bypass system of the embodiments disclosed in FIGS. 1 and 7. The bypass system allows the free flow of hydraulic fluid between the hydraulic reservoir 330 and the hydraulic cylinder 310 and allows manual manipulation of the distal end 316 of the piston rod relative to the cylinder barrel 312, without opposing fluid pressure. Fluid stabilization as described above can also be incorporated herein, although it is not depicted in the current embodiment.

Figure 18:
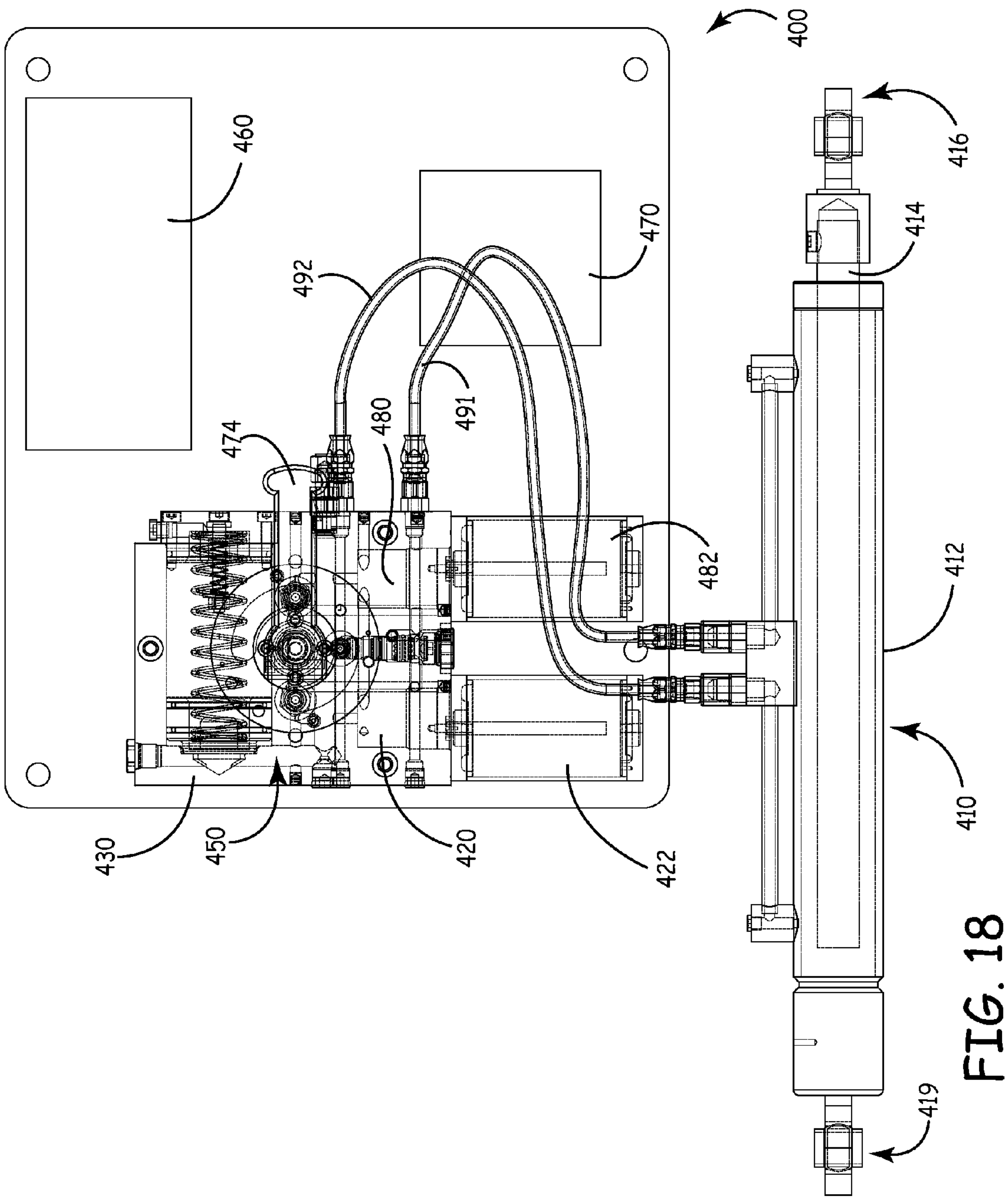
FIG. 18 is a front view of another embodiment of the technology disclosed herein, with interior components shown with broken lines.
Figure 19:
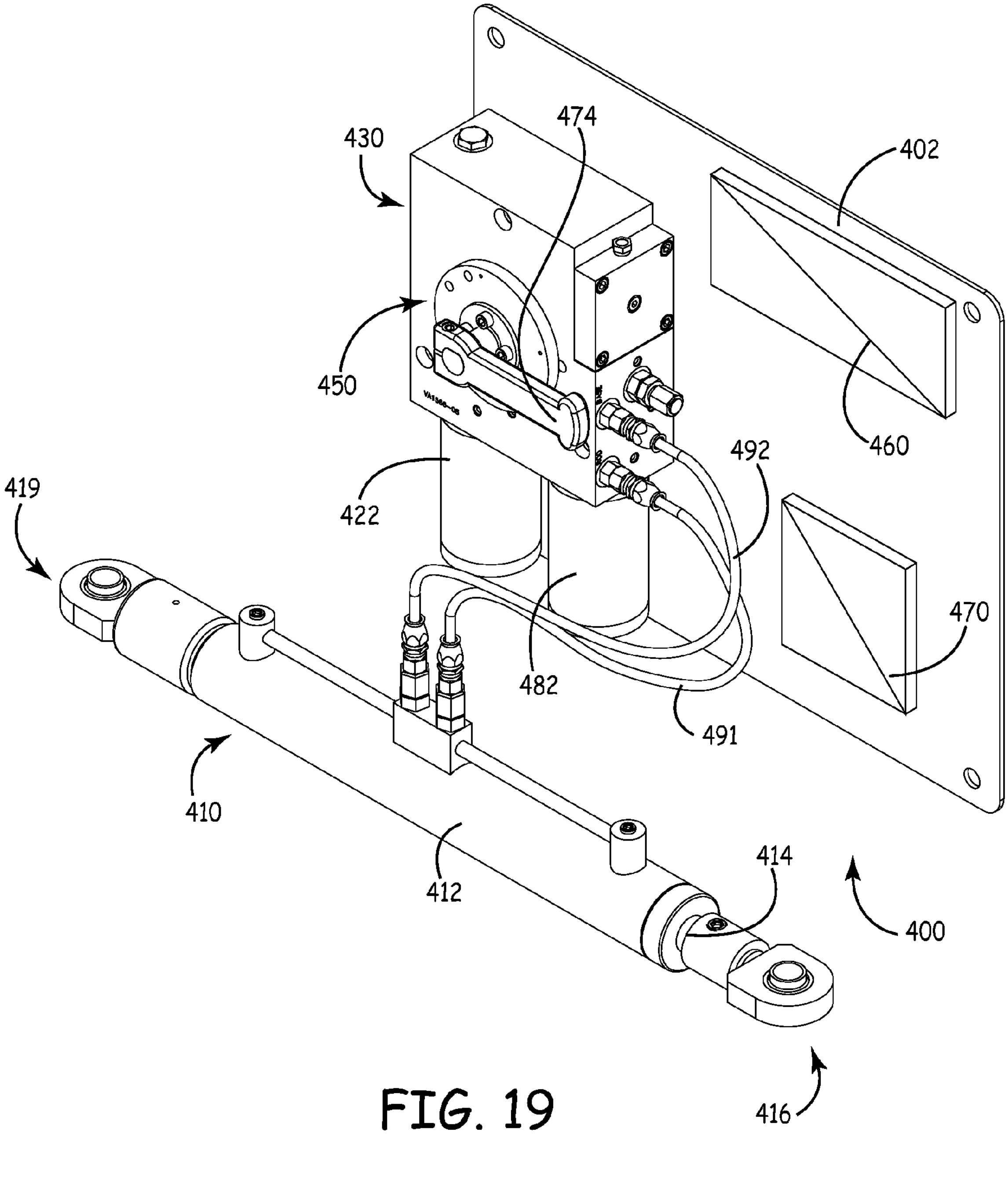
FIG. 19 is a front perspective view of the embodiment depicted in FIG. 18.
Figure 20:
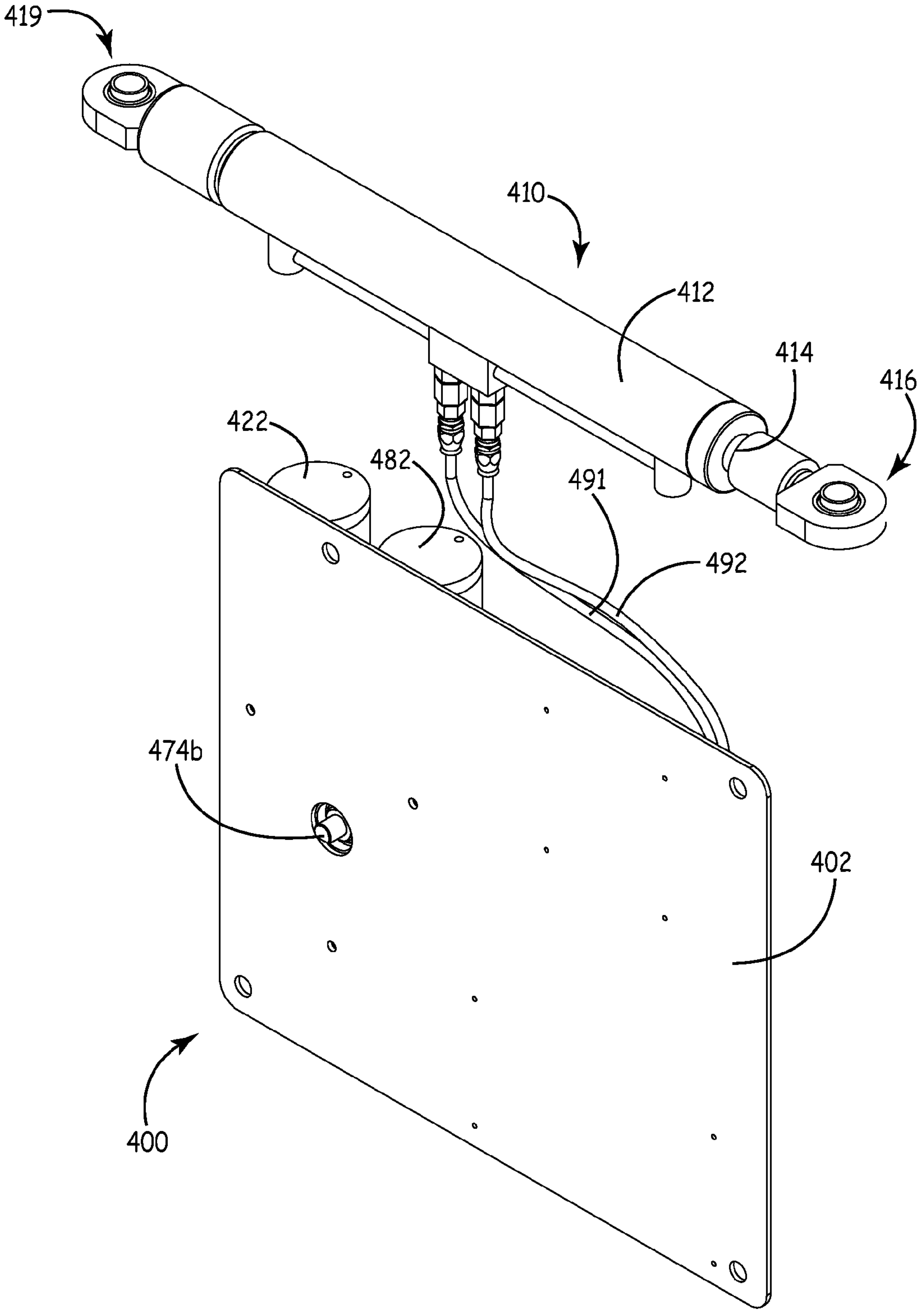
FIG. 20 is a back perspective view of the embodiment depicted in FIG. 18.

FIG. 18 is a front view of one embodiment of a hydraulic system 400 having two pumps, with internal components shown with dotted lines. FIG. 19 is a front perspective view of the embodiment depicted in FIG. 18, and FIG. 20 is a back perspective view of the embodiment depicted in FIG. 18. The current embodiment also has some overlapping components with previously-depicted embodiments.

The system includes a hydraulic cylinder 410 in fluid communication with a hydraulic reservoir 430. A panel 402 is generally for mounting certain components of the system 400 thereon. Mounted components include a hydraulic reservoir 430, a first hydraulic pump 420 and a second hydraulic pump 480 for pumping fluid from the hydraulic reservoir 430 to the hydraulic cylinder 410 (and from the hydraulic cylinder 410 to the hydraulic reservoir 430), a first motor 422 operatively connected to the first pump 420, a second motor 482 operatively connected to the second pump 480, a power source 470 in communication with the first motor 422 and second motor 482, and a hydraulic manifold 450. The hydraulic manifold 450, in this embodiment, is incorporated into the structure of the hydraulic reservoir 430. The hydraulic fluid lines 491, 492 provide pathways for fluid travel. A controller 460 serves as a system-user interface and further interfaces system electronic components. It can be possible for components to be repositioned on the panel 402 based on user-determined need, or the components may not be mounted on a panel at all.

Hydraulic fluid is transmitted to the hydraulic cylinder 410 from the hydraulic reservoir 430 through a first hydraulic pump 420 and a second hydraulic pump 480. The first motor 422 is in operative communication with the first hydraulic pump 420, and the second motor 482 is in operative communication with the second hydraulic pump 480 to extend and retract the distal end 416 of the piston rod 414 relative to the cylinder barrel 412 of the hydraulic cylinder 410. In one embodiment it can be possible for the hydraulic cylinder to move up to 2 metric tons, or 4,400 lbs, of weight.

A bypass system is incorporated in the hydraulic manifold 450 that is integrated in the hydraulic reservoir 430 and is engaged through a bypass lever 474. The bypass lever 474 has a bypass lever shaft 474*b* that is visible in FIG. 20. The panel 402 accommodates the bypass lever shaft 474*b* such that the bypass system can be engaged from either side of the panel 402 such that the bypass system can be engaged from multiple locations. In embodiments where the system is used on a vehicle door, the bypass system can be engaged from both inside and outside the vehicle.

In various embodiments, the depth of the system 400 with a bypass system that can be engaged from either side of the panel 402 is seven inches or less, where the depth is measured from the back of the panel to the furthest point on the components on the front side of the panel. The furthest point on the front of the system can be the front of the bypass lever 474. In embodiment where there is not a bypass system, the furthest point on the front of the system can be the front of the manifold 450. In some embodiments the depth of the system 400 is four inches or less. In at least one embodiment the depth of the system 400 is about 3.5 inches with a bypass system and 2.75 inches without a bypass system.

In various implementations of the embodiments disclosed herein, it can be desirable to reduce the weight of various components of the system. Those of skill in the art will appreciate that various modifications to the system can be made for weight minimization without deviating from the scope of the technology disclosed herein.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as "arranged", "arranged and configured", "constructed and arranged", "constructed", "manufactured and arranged", and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

This application is intended to cover adaptations or variations of the present subject matter. It is to be understood that the above description is intended to be illustrative, and not restrictive.

We claim:

1. An orientation-independent hydraulic system comprising:

a dynamic fluid reservoir defining a first volume substantially equal to the volume of the fluid therein, wherein the dynamic fluid reservoir is the sole source of hydraulic fluid to the system;

a hydraulic cylinder in fluid communication with the dynamic fluid reservoir, wherein the hydraulic cylinder has a second volume of hydraulic fluid and a piston rod configured to extend and retract in response to changes in the second volume wherein the hydraulic cylinder defines a cylinder barrel that is coupled to a first structure, and the piston rod has a distal end that is coupled to a second structure;

a first hydraulic pump configured to pump hydraulic fluid between the hydraulic cylinder and the dynamic fluid reservoir, thereby moving the piston rod between the extended and retracted positions;

a bypass system configured to allow free flow of hydraulic fluid from the hydraulic cylinder to the reservoir, thereby allowing manual extension and retraction of the piston rod; and a second hydraulic pump configured to pump hydraulic fluid between the hydraulic cylinder and the dynamic fluid reservoir, wherein the first hydraulic pump is positioned on a first surface of the reservoir and the second hydraulic pump is positioned on the first surface of the reservoir adjacent the first hydraulic pump.

2. The system of claim 1 wherein the dynamic fluid reservoir comprises:

a reservoir cylinder barrel; and a deformable bladder contained within the barrel, wherein the hydraulic fluid is contained by the bladder.

3. The system of claim 1 wherein the dynamic fluid reservoir comprises:

a reservoir cylinder barrel having an interior wall, and a reservoir piston positioned within the cylinder barrel and forming a sealing engagement with the interior wall of the reservoir cylinder barrel, wherein the hydraulic fluid is present on a first side of the reservoir piston, and the first side of the reservoir piston defines a boundary of the fluid compartment.

4. The system of claim 3 wherein a compressible gas is present on a second opposite side of the reservoir piston.

5. The system of claim 3 wherein a spring is present on a second side of the reservoir piston.

6. The system of claim 1 wherein the first structure is a vehicle body and the second structure is a vehicle door.

7. The system of claim 1 further comprising a transducer in communication with the hydraulic cylinder configured to indicate the position of the piston rod relative to the cylinder barrel.

8. The system of claim 1 further comprising a power source.

9. The system of claim 1 wherein the power source provides DC voltage.

10. The system of claim 1 wherein the power source provides AC voltage.

11. The system of claim 1 further comprising a panel having a first side and a second side, wherein the dynamic fluid reservoir and the first hydraulic pump are mounted on the first side of the panel, wherein a depth of the system is measured from the second side of the panel to a top of any of the mounted components, wherein the depth is five inches or less.

12. The system of claim 11, wherein the depth is 3 inches or less.

13. The system of claim 1 wherein the first structure is a vehicle body and the second structure is a plow blade.

14. The system of claim 1 wherein the first structure is a motor boat transom and the second structure is selected from the group comprising an outboard motor, an outdrive unit and a trim/tilt panel.

15. The system of claim 1 wherein the first structure is an I-beam of a log splitter machine and the second structure is a log splitter wedge.

16. The system of claim 1 where the first structure is a vehicle body and the second structure is selected from the group consisting of a steering wheel and vehicle wheel.

17. A door opener system for opening and closing a door relative to a structure, the door opener system comprising:

a hydraulic cylinder comprising:

a cylinder barrel attached to a door on a structure; and a piston rod that includes a distal end and is moveable between an extended position and a retracted position, where the distal end is configured to attach to the structure;

a transducer configured to communicate with a controller to provide an indication of the position of the piston rod relative to the cylinder barrel;

a first hydraulic pump configured to pump hydraulic fluid to and from the hydraulic cylinder, thereby moving the piston rod between the extended and retracted positions;

a reservoir for hydraulic fluid, the reservoir defining a first volume substantially equal to the volume of hydraulic fluid therein, wherein the reservoir is in fluid communication with the first pump and is the sole source of hydraulic fluid to the system;

a bypass system configured to allow free flow of hydraulic fluid from the cylinder to the reservoir, thereby allowing manual movement of the door relative to the structure; and a second hydraulic pump configured to pump hydraulic fluid to and from the hydraulic cylinder and pump hydraulic fluid from the reservoir, wherein the first pump is positioned adjacent to a first surface of the reservoir and the second pump is positioned adjacent to a second surface of the reservoir, wherein the second surface is opposite the first surface.

18. The system of claim 17 wherein the reservoir comprises:

a reservoir cylinder barrel having an interior wall, and a reservoir piston positioned within the cylinder barrel and forming a sealing engagement with the interior wall of the reservoir cylinder barrel, wherein the hydraulic fluid is present on a first side of the reservoir piston, and the first side of the reservoir piston defines a boundary of the fluid compartment.

19. The system of claim 18 wherein a compressible gas is present on a second opposite side of the reservoir piston.

20. The system of claim 18 wherein a spring is present on a second side of the reservoir piston.

21. The system of claim 17 where the reservoir comprises:

a reservoir cylinder barrel; and a deformable bladder contained within the barrel, wherein the hydraulic fluid is contained by the bladder.

22. The system of claim 17 further comprising a power source providing DC voltage.

23. The system of claim 22 wherein the power source provides AC voltage.

24. The system of claim 17 further comprising a power source providing AC voltage.

25. The system of claim 17 further comprising a panel having a first side and a second side, wherein the dynamic fluid reservoir and the first hydraulic pump are mounted on the first side of the panel, wherein a depth of the system is measured from the second side of the panel to a top of any of the mounted components, wherein the depth is five inches or less.

26. The system of claim 25, wherein the depth is 3 inches or less.

27. An orientation-independent hydraulic system comprising:

(a) a dynamic fluid reservoir defining a first volume substantially equal to the volume of the fluid therein, the dynamic fluid reservoir comprising:

a reservoir cylinder barrel having an interior wall; and a reservoir piston positioned within the reservoir cylinder barrel and forming a sealing engagement with the interior wall of the reservoir cylinder barrel;

wherein the hydraulic fluid is present on a first side of the reservoir piston, and the first side of the reservoir piston defines a boundary of the fluid compartment and one of a spring or compressible gas is present on a second opposite side of the reservoir piston; and wherein the dynamic fluid reservoir is the sole source of hydraulic fluid to the system;

(b) a hydraulic cylinder in fluid communication with the dynamic fluid reservoir, wherein the hydraulic cylinder has a second volume of hydraulic fluid and a piston rod configured to extend and retract in response to changes in the second volume wherein the hydraulic cylinder defines a cylinder barrel that is coupled to a first structure, and the piston rod has a distal end that is coupled to a second structure; and (c) a first hydraulic pump configured to pump hydraulic fluid between the hydraulic cylinder and the dynamic fluid reservoir, thereby moving the piston rod between the extended and retracted positions;

(d) a transducer configured to communicate with a controller to provide an indication of the position of the piston rod relative to the cylinder barrel;

(e) a bypass system configured to allow free flow of hydraulic fluid from the cylinder to the reservoir, thereby allowing manual movement of the second structure relative to the first structure; and (f) a second hydraulic pump configured to pump hydraulic fluid between the hydraulic cylinder and the dynamic fluid reservoir, wherein the first hydraulic pump is positioned on a first surface of the reservoir and the second hydraulic pump is positioned on the first surface of the reservoir adjacent the first hydraulic pump.

* * * * *